United States Patent
Kozicki

(10) Patent No.: US 11,935,843 B2
(45) Date of Patent: Mar. 19, 2024

(54) PHYSICAL UNCLONABLE FUNCTIONS WITH SILICON-RICH DIELECTRIC DEVICES

(71) Applicant: Michael Kozicki, Phoenix, AZ (US)

(72) Inventor: Michael Kozicki, Phoenix, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 212 days.

(21) Appl. No.: 17/112,668

(22) Filed: Dec. 4, 2020

(65) Prior Publication Data

US 2021/0175185 A1 Jun. 10, 2021

Related U.S. Application Data

(60) Provisional application No. 62/945,683, filed on Dec. 9, 2019.

(51) Int. Cl.
*H01L 23/00* (2006.01)
*H01L 23/482* (2006.01)
*H04L 9/32* (2006.01)

(52) U.S. Cl.
CPC .......... *H01L 23/573* (2013.01); *H01L 23/482* (2013.01); *H04L 9/3278* (2013.01)

(58) Field of Classification Search
CPC .......... H01L 23/57–573; H01L 23/482; H01L 29/40; H04L 9/3278
See application file for complete search history.

(56) References Cited

U.S. PATENT DOCUMENTS

| | | |
|---|---|---|
| 4,712,879 A | 12/1987 | Lynam et al. |
| 4,904,338 A | 2/1990 | Kozicki |
| 5,314,772 A | 5/1994 | Kozicki et al. |
| 5,434,917 A | 7/1995 | Naccache et al. |
| 5,761,115 A | 6/1998 | Kozicki et al. |

(Continued)

FOREIGN PATENT DOCUMENTS

| | | |
|---|---|---|
| CN | 113517393 A | 10/2021 |
| DE | 102020122109 A1 | 10/2021 |

(Continued)

OTHER PUBLICATIONS

International Search Report and Written Opinion for Application No. PCT/US2021/030157 dated Sep. 22, 2021 (16 pages).

(Continued)

*Primary Examiner* — Laura M Menz
*Assistant Examiner* — Candice Chan
(74) *Attorney, Agent, or Firm* — Michael Best & Friedrich LLP

(57) ABSTRACT

Systems for physical unclonable function ("PUF") generation, PUF devices, and methods for manufacturing PUF devices. In one implementation, the system includes a plurality of PUF devices and an electronic controller. Each of the plurality of PUF devices include a first electrochemically-inactive electrode, a second electrochemically-inactive electrode, and a layer of silicon suboxide. The layer of silicon suboxide is positioned directly between the first electrochemically-inactive electrode and the second electrochemically-inactive electrode. The electronic controller is communicably coupled to the plurality of PUF devices. The electronic controller is configured to read binary values associated with the plurality of PUF devices.

8 Claims, 10 Drawing Sheets

(56) References Cited

U.S. PATENT DOCUMENTS

| | | |
|---|---|---|
| 5,896,312 A | 4/1999 | Kozicki et al. |
| 5,914,893 A | 6/1999 | Kozicki et al. |
| 6,084,796 A | 7/2000 | Kozicki et al. |
| 6,388,324 B2 | 5/2002 | Kozicki |
| 6,418,049 B1 | 7/2002 | Kozicki et al. |
| 6,469,364 B1 | 10/2002 | Kozicki |
| 6,487,106 B1 | 11/2002 | Kozicki |
| 6,635,914 B2 | 10/2003 | Kozicki et al. |
| 6,798,692 B2 | 9/2004 | Kozicki et al. |
| 6,825,489 B2 | 11/2004 | Kozicki |
| 6,865,117 B2 | 3/2005 | Kozicki |
| 6,914,802 B2 | 7/2005 | Kozicki |
| 6,927,411 B2 | 8/2005 | Kozicki |
| 6,940,745 B2 | 9/2005 | Kozicki |
| 6,985,378 B2 | 1/2006 | Kozicki |
| 6,998,312 B2 | 2/2006 | Kozicki et al. |
| 7,006,376 B2 | 2/2006 | Kozicki |
| 7,085,928 B1 | 8/2006 | Schmid et al. |
| 7,101,728 B2 | 9/2006 | Kozicki et al. |
| 7,142,450 B2 | 11/2006 | Kozicki et al. |
| 7,145,794 B2 | 12/2006 | Kozicki |
| 7,169,635 B2 | 1/2007 | Kozicki et al. |
| 7,180,104 B2 | 2/2007 | Kozicki |
| 7,227,169 B2 | 6/2007 | Kozicki |
| 7,288,781 B2 | 10/2007 | Kozicki |
| 7,294,875 B2 | 11/2007 | Kozicki |
| 7,372,065 B2 | 5/2008 | Kozicki et al. |
| 7,385,219 B2 | 6/2008 | Kozicki et al. |
| 7,402,847 B2 | 7/2008 | Kozicki et al. |
| 7,405,967 B2 | 7/2008 | Kozicki et al. |
| 7,560,722 B2 | 7/2009 | Kozicki |
| 7,675,766 B2 | 3/2010 | Kozicki |
| 7,728,322 B2 | 6/2010 | Kozicki |
| 7,763,158 B2 | 7/2010 | Kozicki |
| 7,929,331 B2 | 4/2011 | Kozicki |
| 8,022,384 B2 | 9/2011 | Kozicki |
| 8,134,140 B2 | 3/2012 | Kozicki |
| 8,213,217 B2 | 7/2012 | Kozicki |
| 8,213,218 B2 | 7/2012 | Kozicki |
| 8,218,350 B2 | 7/2012 | Kozicki |
| 8,300,450 B2 | 10/2012 | Christensen et al. |
| 8,331,128 B1 | 12/2012 | Derhacobian et al. |
| 8,742,531 B2 | 6/2014 | Kozicki |
| 8,941,089 B2 | 1/2015 | Gopalan et al. |
| 8,999,819 B2 | 4/2015 | Kozicki et al. |
| 9,165,644 B2 | 10/2015 | Kamalanathan et al. |
| 9,460,807 B2 | 10/2016 | Chung |
| 9,627,055 B1 | 4/2017 | Robustelli |
| 9,773,141 B2 | 9/2017 | Kozicki |
| 9,836,633 B2 | 12/2017 | Kozicki |
| 9,917,104 B1 | 3/2018 | Roizin et al. |
| 9,971,566 B2 | 5/2018 | Cambou |
| 9,985,791 B2 | 5/2018 | Cambou |
| 10,074,000 B2 | 9/2018 | Kozicki |
| 10,090,840 B1 | 10/2018 | Lee et al. |
| 10,223,567 B2 | 3/2019 | Kozicki |
| 10,466,969 B2 | 11/2019 | Kozicki et al. |
| 10,467,447 B1 | 11/2019 | Kozicki |
| 10,558,172 B2 | 2/2020 | Kozicki |
| 10,644,892 B2 | 6/2020 | Afghah et al. |
| 10,710,070 B2 | 7/2020 | Kozicki et al. |
| 10,810,731 B2 | 10/2020 | Kozicki |
| 2002/0127886 A1 | 9/2002 | Moore et al. |
| 2003/0107105 A1 | 6/2003 | Kozicki |
| 2004/0101729 A1 | 5/2004 | Kearl |
| 2004/0124407 A1 | 7/2004 | Kozicki et al. |
| 2005/0225413 A1 | 10/2005 | Kozicki et al. |
| 2006/0145610 A1 | 7/2006 | Eifuku et al. |
| 2006/0238185 A1 | 10/2006 | Kozicki |
| 2006/0291364 A1 | 12/2006 | Kozicki |
| 2007/0285148 A1 | 12/2007 | Sakamoto et al. |
| 2008/0231418 A1 | 9/2008 | Ophey et al. |
| 2008/0296697 A1 | 12/2008 | Hsu et al. |
| 2010/0072448 A1 | 3/2010 | Khoueir et al. |
| 2010/0193761 A1 | 8/2010 | Amin et al. |
| 2010/0199104 A1 | 8/2010 | Van Rijnswou |
| 2011/0180775 A1 | 7/2011 | Lin et al. |
| 2011/0254141 A1 | 10/2011 | Roest et al. |
| 2011/0286258 A1 | 11/2011 | Chen et al. |
| 2012/0183135 A1 | 7/2012 | Paral et al. |
| 2013/0134374 A1 | 5/2013 | Kim et al. |
| 2013/0220413 A1 | 8/2013 | Kozicki et al. |
| 2015/0071432 A1 | 3/2015 | Zhu et al. |
| 2015/0194545 A1 | 7/2015 | Kozicki et al. |
| 2015/0195088 A1 | 7/2015 | Rostami et al. |
| 2015/0304115 A1 | 10/2015 | Kim et al. |
| 2015/0372060 A1 | 12/2015 | Terai et al. |
| 2017/0098469 A1 | 4/2017 | Park |
| 2017/0230598 A1 | 8/2017 | Takayanagi et al. |
| 2018/0088059 A1 | 3/2018 | Kozicki |
| 2018/0197607 A1 | 7/2018 | Bandic et al. |
| 2018/0358313 A1 | 12/2018 | Newman et al. |
| 2019/0197265 A1 | 6/2019 | Kozicki |
| 2019/0221739 A1 | 7/2019 | Kim et al. |
| 2019/0378638 A1 | 12/2019 | Liu et al. |
| 2020/0006649 A1 | 1/2020 | Jiang et al. |
| 2020/0036037 A1 | 1/2020 | Krause et al. |
| 2020/0117882 A1 | 4/2020 | Kozicki |
| 2020/0272797 A1 | 8/2020 | Kozicki |
| 2020/0338556 A1 | 10/2020 | Kozicki et al. |
| 2020/0381372 A1 | 12/2020 | Kozicki et al. |
| 2021/0090649 A1 | 3/2021 | Kozicki et al. |
| 2021/0305508 A1 | 9/2021 | Lee et al. |

FOREIGN PATENT DOCUMENTS

| | | |
|---|---|---|
| KR | 101566949 B1 | 11/2015 |
| WO | WO1997048032 A2 | 12/1997 |
| WO | WO1997048032 A3 | 12/1997 |
| WO | WO1999028914 A2 | 6/1999 |
| WO | WO2000048196 A1 | 8/2000 |
| WO | WO2002021542 A1 | 3/2002 |
| WO | WO2002082452 A2 | 10/2002 |
| WO | WO2002099517 A2 | 12/2002 |
| WO | WO2003028098 A2 | 4/2003 |
| WO | WO2003032392 A2 | 4/2003 |
| WO | WO2003036735 A2 | 5/2003 |
| WO | WO2003058638 A1 | 7/2003 |
| WO | WO2003079463 A2 | 9/2003 |
| WO | WO2005083810 A2 | 9/2005 |
| WO | WO2005124788 A2 | 12/2005 |
| WO | WO2006043185 A1 | 4/2006 |
| WO | WO2008120128 A2 | 10/2009 |
| WO | WO2012065076 A1 | 5/2012 |
| WO | WO2018175973 A1 | 9/2018 |

OTHER PUBLICATIONS

Abtew, M. Zhang, and D. A. Drabold, "Ab initio estimate of temperature dependence of electrical conductivity in a model amorphous material: Hydrogenated amorphous silicon," Phys. Rev. B 76, 045212 (2007).

Afghah et al., Concatenation of space-time block codes and LDPC codes. The 13th INTNSPS, 2008. 1-5.

Alajerami, K. Cimatu, G. Chen and D. A. Drabold, Radiation shielding properties of Bismuth Borate glasses doped with Cadmium Oxide, Ceramics International 46 12718 (2020).

Allen and J. Q. Broughton, "Electrical Conductivity and Electronic Properties of Liquid Silicon," J. Phys.Chem. 91, 4964 (1987).

Auguste, "La cryptographie militaire," Journal des sciences militaires, vol. 9, pp. 5-38, 1883 (statement of relevance included).

Balakrishnan, S. C. P. Thermadam, M. Mitkova, and M. N. Kozicki, "A Low Power Non-Volatile Memory Element Based on Copper in Deposited Silicon Oxide," in 2006 7th Annual Non-Volatile Memory Technology Symposium, 2006, pp. 104-110.

Baranger et al., Electrical linear-response theory in an arbitrary magnetic field: A new Fermi-surface formation, Phys. Rev. B 40, 8169 (1989).

Barranco, F. Yubero, J. P. Espinos, P. Groening, A. R. Gonzalez-Elipe, Electronic state characterization of SiOx thin films prepared by evaporation, J. Appl. Phys. 97, 113714 (2005).

(56) References Cited

OTHER PUBLICATIONS

Barranco, J. A. Mejias, J. P. Espinos, A. Caballero, A. R. Gonzalez-Elipe, F. Yubero, Chemical stability of Si+n species in SiOx (x<2) thin films, J. Vac. Sci. Technol. A 19(1) Jan./Feb. 2001.

Barranco, J. Cotrino, F. Yubero, J. P. Espinos, A. R. Gonzalez-Elipe, Room temperature synthesis of porous SiO2 thin-films by plasma enhanced chemical vapor deposition, J. Vac. Sci. Technol. A (4), Jul./Aug. 2004.

Bartók, J Kermode, N Bernstein, G Csányi, Machine learning a general-purpose interatomic potential for silicon, Phys. Rev. X 8 041048 (2018).

Belandi et al., SiO2 Etch Rate Modification by Ion Implantation, Solid State Phenomena, vol. 195, pp. 55-57, Dec. 2012.

Bernard, V. T. Renard, P. Gonon, and V. Jousseaume, "Back-end-of-line compatible Conductive Bridging RAM based on Cu and SiO2," Microelectron. Eng., vol. 88, No. 5, pp. 814-816, 2011.

Bernstein, B. Bhattarai, G. Csányi, D. A. Drabold, S. R. Elliott, V. L. Deringer, Quantifying Chemical Structure and Atomic Energies in Amorphous Silicon Networks, Angewandte Chemie 58 7057 (2019).

Berrou et al., Near Optimum Error Correcting Coding and Decoding: Turbo-Codes; IEEE Trans. on Communications 44, No. 10 (1996): 1261-1271.

Bhattarai and D. A. Drabold, Vibrations in amorphous silica, J. Non. Cryst. Sol. 439 6 (2016).

Bhattarai, A. Pandey and D. A. Drabold, Evolution of amorphous carbon across densities, an inferential study, Carbon 131 168 (2018).

Bhattarai, P. Biswas, R. Atta-Fynn and D. A. Drabold, Amorphous graphene: a constituent part of low density amorphous carbon, Phys. Chem. Chem. Phys. 20 19546 (2018).

Bhattarai, R. Thapa and D. A. Drabold, Ab initio inversion of structure and the lattice dynamics of a metallic glass: the case of Pd40Ni40P20, Modeling and Simulation in Materials Science and Engineering 27 075002 (2019).

Binnig, H. Rohrer, Ch. Gerber, and E. Weibel, 7 × 7 Reconstruction on Si(111) Resolved in Real Space, Phys. Rev. Lett. 50 120 (1983).

Boyd and J. I. B. Wilson, A study on thin silicon dioxide films using infrared absorption techniques, J. App. Phys. 53 (6), pp. 4166-4171, Jun. 1982.

Brier et al., "Correlation power analysis with a leakage model," in International Workshop on Cryptographic Hardware and Embedded Systems, 2004, pp. 16-29.

Cambou et al., Integrated Technology and policy Enabling Large-Scale Deployment of UAVs: Trustworthiness and Threat Mitigation; IEEE workshop on IoT security, Arlington, Feb. 2016.

Cambou et al., PUF designed with ReRAM and ternary states; CISR 2016, pp. 1-8.

Cambou, F. Afghah, D. Sonderegger, J. Taggart, H. Barnaby, M. N. Kozicki, Ag conductive bridge RAMs for physical unclonable functions, Proceeding of the IEEE Host Conference, 2017, vol. 1, pp. 151-151.

Cao et al., CMOS image based PUF for coherent sensor-level authentication; IEEE trans. on circuits and systems, vol. 62, issue 11, pp. 2629-2640. 2015.

Carboni and D. Ielmini (2019) Stochastic Memory Devices for Security and Computing, Adv. Electron. Mater. 2019, pp. 1900198, DOI: 10.1002/aelm.201900198.

Casini, Understanding Machine Learning effectiveness to protect WEB authentication, Venezia: Universita Ca Foscari, 2014.

Chen et al., "Exploiting resistive cross-point array for compact design of physical unclonable function," in IEEE International Symposium on Hardware Oriented Security and Trust—HOST, 2015, pp. 26-31.

Chen et al., "Total-Ionizing-Dose Effects on Resistance Stability of Programmable Metallization Cell Based Memory and Selectors," IEEE Trans. Nucl. Sci., vol. 64, No. 1, pp. 269-276, 2017.

Chen, J. Wu, Q. Zhang and X. Su, Recent advancement of SiOx based anodes for lithium-ion batteries, J. Power Sources 363, 126 (2017).

Chen, S. Tappertzhofen, H. Barnaby, M. N. Kozicki, SiO2 based conductive bridging random access memory, J Electroceram (2017) 39:109-131.

Chen, W. et al., "Volatile and Non-Volatile Switching in Cu—SiO2 Programmable Metallization Cells", IEEE Electron Device Letters, May 2016 [IEEE Date of Publication: Mar. 2016], vol. 37, No. 5, pp. 580-583 <DOI:10.1109/LED.2016.2540361>.

Choi et al., "Data clustering using memristor networks," Scientific Reports, 5:10492, 2015.

College Transitions, "Top Honors Programs," <https://www.collegetransitions.com/dataverse/top-honors-programs> publicly available at least as early as Oct. 16, 2019.

Cortez et al., "Modeling SRAM start-up behavior for physical unclonable functions," in 2012 IEEE International Symposium on Defect and Fault Tolerance in VLSI and Nanotechnology Systems (DFT), 2012, pp. 1-6.

Coteus et al., "Technologies for exascale systems," IBM Journal of Research and Development, 55(5):14, 2011.

Damiani et al., "New paradigms for access control in open environments," in Proceedings of the 5th IEEE International Symposium on Signal Processing and Information Technology, 2005, pp. 540-545.

De Los Santos Valladares et al., "Crystallization and electrical resistivity of Cu2O and CuO obtained by thermal oxidation of Cu thin films on SiO2/Si substrates," Thin Solid Films, vol. 520, No. 20, pp. 6368-6374, 2012.

Dearnaley, A. Stoneham, D. Morgan, Electrical phenomena in amorphous oxide films. Rep. Prog. Phys. 33, 1129 (1970).

Defense Advanced Research Projects Agency (DARPA), "Supply Chain Hardware Integrity for Electronics Defense (SHIELD)," <https://www.darpa.mil/program/supply-chain-hardware-integrity-for-electronics-defense> publicly available at least as early as Jul. 2015.

Deringer, N. Bernstein, G. Csanyi, M. Wilson, D. A. Drabold and S. R. Elliott, Structural transitions in dense disordered silicon from quantum-accurate ultra-large-scale simulations, Submitted to Nature Dec. 2019.

Devadas et al., "Design and implementation of PUF-based 'unclonable' RFID ICs for anti-counterfeiting and security applications," in IEEE International conference on RFID, 2008, pp. 58-64.

Dong and D. A. Drabold, Atomistic structure of band tail states in amorphous silicon, Phys. Rev. Lett. 80 1928 (1998).

Dong and D. A. Drabold, Ring formation and the structural and electronic properties of tetrahedral amorphous carbon surfaces, Phys. Rev. B 57 15591 (1998).

Drabold, "David Drabold Distinguished Professor of Physics," Ohio University, <https://daviddrabold.com/people/> publicly available at least as early as Feb. 9, 2019.

Drabold, Topics in the theory of amorphous materials, European Physical Journal B 68 1 (2009).

Economou and C. M. Soukoulis, Static Conductance and Scaling Theory of Localization in One Dimension, Phys. Rev. Lett. 46, 618 (1981).

Falk et al., New Directions in Applying Physical Unclonable Functions; SECUWARE 2015.

Fei et al., "A statistical model for DPA with novel algorithmic confusion analysis," in International Workshop on Cryptographic Hardware and Embedded Systems, 2012, pp. 233-250.

Fei et al., "A statistics-based fundamental model for side-channel attack analysis." IACR Cryptology ePrint Archive, vol. 2014, p. 152, 2014.

Galli, R. M. Martin, R. Car, and M. Parrinello, "Ab initio calculation of properties of carbon in the amorphous and liquid states," Phys. Rev. B 42,7470 (1990).

Gao et al., "Memristive crypto primitive for building highly secure physical unclonable functions," Scientific Reports, 5:12785, 2015.

Gao et al., "mrPUF: A novel memristive device based physical unclonable function," in Applied Cryptography and Network Security, 2015, pp. 595-615.

Gao et al., Exploiting Unreliability of the PUF to Secure Remote Wireless Sensing; Int. association for cryptologic research, 2015:1240, 2015.

(56) References Cited

OTHER PUBLICATIONS

Gao, L. et al., "Physical Unclonable Function Exploiting Sneak Paths in Resistive Cross-point Array", IEEE Transactions on Electron Devices, Aug. 2016 [IEEE date of publication: Jun. 2016], vol. 63, No. 8, pp. 3109-3115 <DOI:10.1109/TED.2016.2578720>.
Gao, S. F. Al-Sarawi, D. Abbott, Physical unclonable functions. Nat Electron 3, 81-91 (2020).
Garcia-Valenzuela, R. Alvarez, J.-P. Espinos, V. Rico, J. Gil-Rostra, A. Palmero, A. R. Gonzalez-Elipe, SiOx by magnetron sputtered revisited: Tailoring the photonic properties of multilayers, Appl. Surf. Sciences 488, pp. 791-800, (2019).
Gassend et al., "Identification and authentication of integrated circuits," Concurrency and Computation: Practice and Experience, vol. 16, No. 11, pp. 1077-1098, 2004.
Gassend; Physical random functions; M.S. thesis, Dept. Electr. Eng. Comput. Sci., MA, USA, Massachusetts Inst. Technol., Cambridge, 2003.
Ghijsen et al., "Electronic structure of Cu2O and CuO," Phys. Rev. B, vol. 38, No. 16, pp. 11322-11330, 1988.
Gilbert et al. "A 0.6 V 8 pJ/write Non-Volatile CBRAM Macro Embedded in a Body Sensor Node for Ultra Low Energy Applications." VLSI Circuits (VLSIC), 2013 Symposium on. IEEE, 2013.
Gopalan et al., "Demonstration of Conductive Bridging Random Access Memory (CBRAM) in logic CMOS process," Solid. State. Electron., vol. 58, No. 1, pp. 54-61, 2011.
Gopalan, M. N. Kozicki, S. Bhagat, S. C. Puthen Thermadam, T. L. Alford, and M. Mitkova, "Structure of copper-doped tungsten oxide films for solid-state memory," J. Non. Cryst. Solids, vol. 353, No. 18-21, pp. 1844-1848, 2007.
Grassini, M. Ishtaiwi, M. Parvis, L. Benussi, S. Bianco, S. Colafranceschi, D. Piccolo, SiOx coated plastic fiber optic sensor for gas monitoring in RPC, Proceeding of Science, (RPC2012)072.
Guajardo et al., "Brand and IP protection with physical unclonable functions," in IEEE International Symposium on Circuits and Systems (ISCAS), 2008, pp. 3186-3189.
Guajardo et al., "FPGA intrinsic PUFs and their use for IP protection," in International workshop on Cryptographic Hardware and Embedded Systems, 2007, pp. 63-80.
Guajardo et al., Physical Unclonable Functions and Public Key Crypto for FPGA IP Protection. In: International Conference on Field Programmable Logic and Applications—FPL 2007, Aug. 27-30, 2007, pp. 189-195. IEEE, Los Alamitos (2007).
Han and M. Tao, "Electrochemically deposited p-n homojunction cuprous oxide solar cells," Sol. Energy Mater. Sol. Cells, vol. 93, No. 1, pp. 153-157, 2009.
Helfmeier et al., "Cloning physically unclonable functions," in IEEE International Symposium on Hardware-Oriented Security and Trust—HOST, 2013, pp. 1-6.
Helfmeier et al.; Physical Vulnerabilities of PUFs; Proceedings of the conference on Design, Automation & Test (DARE'14). Belgium, 2014.
Herasimenka, W. J. Dauksher, M. Boccard, S. Bowden, ITO/SiOx:H stacks for silicon heterojunction solar cells, Solar Energy Materials & Solar Cells158 (2016) pp. 98-101.
Herder et al., "Physical Unclonable Functions: A Tutorial," Proc. IEEE, vol. 102 (2014) 1126-1141.
Hernandez, P. Miska, M. Grun, S. Estrade, F. Peiro, B. Garrido, M. Vergant, P. Pellegrino, Tailoring the Surface density of silicon nanocrystals embedded in SiOx single layers, J. Appl. Phys. 114, 233101 (2013).
Hofer et al., Error correction coding for physical unclonable functions. In: Austrochip, Workshop on Microelectronics, 2010.
Holcomb et al., "Initial SRAM state as a fingerprint and source of true random numbers for RFID tags," in Proceedings of the Conference on RFID Security, vol. 7, 2007.
Hori et al., "Quantitative and statistical performance evaluation of arbiter physical unclonable functions on FPGAS," in IEEE International Conference on Reconfigurable Computing and FPGAs (ReConFig), 2010, pp. 298-303.

Hu et al., "Physically unclonable cryptographic primitives using self-assembled carbon nanotubes," Nature Nanotechnology, vol. 11, No. 6, pp. 559-565, 2016.
Hvarinen et al., Independent Component Analysis, algorithms, and applications; Neural Networks, vol. 13, 411-430, 2000.
Igram, B. Bhattarai, P. Biswas and D. A. Drabold, Large and realistic models of amorphous silicon, J. Non-Cryst. Sol 492 27 (2018).
Igram, H. Castillo and D. A. Drabold, Structure and dynamics of an Ag-doped chalcogenide glass, an ab initio study, J. Non-Cryst. Sol. 514 1 (2019).
Inam and D. A. Drabold, Theoretical study of an amorphous chalcogenide surface. J. Non-Cryst. Sol. 354 2495 (2008).
International Preliminary Report on Patentability for Application No. PCT/US2018/024156 dated Oct. 3, 2019 (14 pages).
International Search Report and Written Opinion for Application No. PCT/US2018/024156 dated Jul. 13, 2018 (16 pages).
Jayatissa, K. Guo, and A. C. Jayasuriya, "Fabrication of cuprous and cupric oxide thin films by heat treatment," Appl. Surf. Sci., vol. 255, No. 23, pp. 9474-9479, 2009.
Je, J. Kim, J. C. Harrison, M. N. Kozicki, and J. Chae, "In situ tuning of omnidirectional microelectromechanical-systems microphones to improve performance fit in hearing aids," Appl. Phys. Lett., vol. 93, No. 12, pp. 1-4, 2008.
Joseph et al., "Machine Learning Methods for computer security," Dagstuhl Perspective Workshop 12371, 2012.
Kaganov, "Machine Learning Methods in Authentication Problems using Password Keystroke dynamics," Computational Mathematics and Modeling, vol. 26, No. 3, pp. 398-407, 2015.
Kang, B. Arnold, C. J. Summers, B. K. Wagner, Synthesis of silicon quantum dot buried SiOx films with controlled luminescent properties for solid-state lighting, Nanotechnology 17 (2006) pp. 4477-4482.
Katzenbeisser et al.; PUFs: Myth, Fact or Busted? A Security Evaluation of Physically Unclonable Functions Cast in Silicon; CHES, 2012, pp. 283-301.
Kilian, D. A. Drabold and J. B. Adams, First principles simulations of a-Si and a-Si:H surfaces, Phys. Rev. B 48 17393 (1993).
Kim et al., "A Physical Unclonable Function with Redox-based Nanoionic Resistive Memory," arXiv:1611.04665v1 [cs.ET], (2016).
Kinget, "Device mismatch and tradeoffs in the design of analog circuits," IEEE Journal of Solid-State Circuits, vol. 40, No. 6, pp. 1212-1224, 2005.
Klingsporn, S. Kirner, C. Villringer, D. Abou-Ras, I. Costina, M. Lehmann, and B. Stannowski, Resolving the nanostructure of plasma-enhanced chemical vapor deposited nanocrystalline SiOx layers for application in solar cells, J. Appl. Phys. 119, 223104 (2016).
Kobayashi et al., "A current-mode latch sense amplifier and a static power saving input buffer for low-power architecture," in Symposium on VLSI Circuits, 1992, pp. 28-29.
Kocher et al., "Introduction to differential power analysis," Journal of Cryptographic Engineering, vol. 1, No. 1, pp. 5-27, 2011.
Koeberl et al., "Memristor PUFs: a new generation of memory-based physically unclonable functions," in Proceedings of the Conference on Design, Automation and Test in Europe, 2013, pp. 428-431.
Koffyberg and F. A. Benko, "A photoelectrochemical determination of the position of the conduction and valence band edges of p-type CuO," J. Appl. Phys., vol. 53, No. 2, pp. 1173-1177, 1982.
Konstantinou et al., "Cyber-physical systems: A security perspective," in 20th IEEE European Test Symposium (ETS), 2015, pp. 1-8.
Kozicki and H. J. Barnaby, "Conductive bridging random access memory—Materials, devices and applications," Semicond. Sci. Technol., vol. 31, No. 11, 2016.
Kozicki et al., "Mass transport in chalcogenide electrolyte films—materials and applications," J. of Non-Crystalline Solids, vol. 352, pp. 567-577, Mar. 2006.
Kozicki et al., "Nonvolatile memory based on solid electrolytes," in Proc. IEEE Non-Volatile Memory Technol. Symp., pp. 10-17, 2004.
Kozicki et al., "Nanoscale memory elements based on solid-state electrolytes," IEEE Trans. Nanotechnol, vol. 4, pp. 331-338, May 2005.

(56) References Cited

OTHER PUBLICATIONS

Kozicki et al., "Programmable metallization cell memory based on Ag—Ge—S and Cu—Ge—S solid electrolytes," Proc. NVMTS, p. 83-89, 2005.

Kozicki, C. Gopalan, M. Balakrishnan, and M. Mitkova, "A low-power nonvolatile switching element based on copper-tungsten oxide solid electrolyte," IEEE Trans. Nanotechnol., vol. 5, No. 5, pp. 535-544, 2006.

Kozicki, M. Mitkova, M. Park, M. Balakrishnan, and C. Gopalan, "Information storage using nanoscale electrodeposition of metal in solid electrolytes," Superlattices Microstruct., vol. 34, No. 3-6, pp. 459-465, 2003.

Kozicki, P. Maroufkhani, and M. Mitkova, "Valving in microchannels via electrodeposition on solid electrolytes," vol. 1, No. January, pp. 716-719, 2005.

Kozicki, Y. Gonzalez-Velo, A. Patadia, P. Apsangi, H. J. Barnaby, J. Allgair, B. Attaway, J. Callahan, S. Follis, J. Morris, S. Shive, A. Velaga, Copper-Silicon oxide resistive memory: A versatile back-end-of-line technology, invited presentation, Memrisys 2019, Dresden, Jul. 8-11.

Kresse et al., "Efficiency of ab-initio total energy calculations for metals and semiconductors using a plane-wave basis set," Comput. Mater. Sci. 6:15-50 (1996).

Kresse et al., "Efficient iterative schemes for ab initio total-energy calculations using a plane-wave basis set," Phys. Rev. B 54(16):11169-11186 (1996).

Kumar et al., "The butterfly PUF protecting IP on every FPGA," in IEEE International Workshop on Hardware-Oriented Security and Trust—HOST, 2008, pp. 67-70.

Kuzmin, A. Anspoks, A. Kalinko, J. Timoshenko, and R. Kalendarev, "X-ray absorption spectroscopy of Cu-doped WO3 films for use in electrochemical metallization cell memory," J. Non. Cryst. Solids, vol. 401, pp. 87-91, 2014.

Kwon et al., "Nanoscale CuO solid-electrolyte-based conductive-bridging-random-access-memory cell operating multi-level-cell and 1selector1resistor," J. Mater. Chem. C, vol. 3, No. 37, pp. 9540-9550, 2015.

Legenstein, "Computer science: Nanoscale connections for brain-like circuits," Nature, vol. 521, No. 7550, pp. 37-38, 2015.

Lim et al., "Extracting secret keys from integrated circuits," IEEE Transactions on Very Large Scale Integration (VLSI) Systems, vol. 13, No. 10, pp. 1200-1205, 2005.

Llyod, Least Squares Quantization in PCM; IEEE Transactions on Information Theory 18, No. 2 (1982).

Lucovsky, J. Manitini, Low temperature growth of silicon dioxide films: A study of chemical bonding by ellipsometry and infra-red spectroscopy, J. Vac. Sci. Technol. B 5 (2) Mar./Apr. 1987.

Ludlam, S. N. Taraskin, S. R. Elliott and D. A. Drabold, Universal features of eigenstates in disordered systems, J. Phys. Cond. Matter 17 L321 (2005).

Luo et al., "Algorithmic collision analysis for evaluating cryptographic systems and side-channel attacks," in IEEE International Symposium on Hardware-Oriented Security and Trust (HOST), 2011, pp. 75-80.

Maes et al., A Soft Decision Helper Data Algorithm for SRAM PUFs; 2016 IEEE International Symposium on Information Theory. 2009.

Maes, "Physically unclonable functions: Constructions, properties and applications," Ph.D. dissertation, Ph. D. thesis, Dissertation, University of KU Leuven, 2012.

Maiti et al., "A robust physical unclonable function with enhanced challenge-response set," IEEE Transactions on Information Forensics and Security, vol. 7, No. 1, pp. 333-345, 2012.

Majzoobi et al., "Slender PUF protocol: A lightweight, robust, and secure authentication by substring matching," in IEEE Symposium on Security and Privacy Workshops-SPW, 2012, pp. 33-44.

Majzoobi et al., "Techniques for design and implementation of secure reconfigurable PUFs," ACM Transactions on Reconfigurable Technology and Systems (TRETS), vol. 2, No. 1, pp. 5:1-5:33, 2009.

Majzoobi et al., "Testing techniques for hardware security," in IEEE International Test Conference (ITC), 2008, pp. 1-10.

Mannion, A. Mehonic, W. H. Ng, A. J. Kenyon, Memristor-Based Edge Detection for Spike Encoded Pixels, Front. Neurosci. 13:1386, 2020.

Mehonic, A. J. Kenyon, Emulating the Electrical Activity of the Neuron Using a Silicon Oxide RRAM Cell, Front. Neurosci. 10:57, 2016.

Mehonic, A. L. Shluger, D. Gao, I. Valov, E. Miranda, D. Ielmini, A. Bricalli, E. Ambrosi, C. Li, J. J. Yang, Q. Xia, A. J. Kenyon, Silicon Oxide (SiOx): A Promising Material for Resistance Switching?, Adv. Mater. 2018, 30, 1801187.

Mehonic, M. Buckwell, L. Montesi, L. Garnett, S. Hudziak, S. Fearn, R. Chater, D. McPhail, A. J. Kenyon, Structural changes and conductance thresholds in metal-free intrinsic SiOx resistive random access memory, J. Appl. Phys. 117, 124505 (2015).

Mehonic, M. Buckwell, L. Montesi, M. S. Munde, D. Gao, S. Hudziak, R. J. Chater, S. Fearn, D. McPhail, M. Bosman, A. L. Shluger, A. J. Kenyon, Nanoscale Transformations in Metastable, Amorphous, Silicon-Rich Silica Adv. Mater. 2016, 28, 7486-7493.

Mehonic, M.S. Munde, W.H. Ng, M. Buckwell, L. Montesi, M. Bosman, A.L. Shluger, A.J. Kenyon, Intrinsic resistance switching in amorphous silicon oxide for high performance SiOx ReRAM devices, Microelectronic Engineering, 178, 2017, pp. 98-103, (2017).

Mehonic, S. Cueff, M. Wojdak, S. Hudziak, C. Labbe, R. Rizk, A. J Kenyon, Electrically tailored resistance switching in silicon oxide, Nanotechnology 23 (2012) 455201 (9pp).

Mehonic, S. Cueff, M. Wojdak, S. Hudziak, O. Jambois, C. Labbé, B. Garrido, R. Rizk, A. J. Kenyon, Resistive switching in silicon suboxide films, J. Appl. Phys. 111, 074507 (2012).

Messerges et al., "Examining smart-card security under the threat of power analysis attacks," IEEE Transactions on Computers, vol. 51, No. 5, pp. 541-552, 2002.

Mickel et al., "A physical model of switching dynamics in tantalum oxide memristive devices," Appl. Phys. Lett., vol. 102, p. 223502, 2013.

Mitkova and M. N. Kozicki, "Silver incorporation in Ge—Se glasses used in programmable metallization cell devices," J. Non. Cryst. Solids, vol. 299-302, No. PART 2, pp. 1023-1027, 2002.

Moore, "Moore's Law ,Electronics," vol. 38, No. 8, p. 114, 1965.

Munde, A. Mehonic, W. H. Ng , M. Buckwell, L. Montesi, M. Bosman, A. L. Shluger, A. J. Kenyon, Intrinsic Resistance Switching in Amorphous Silicon Suboxides: The Role of Columnar Microstructure, Scientific Reports 7: 9274, 2017.

Murarka, "Multilevel interconnections for ULSI and GSI era," Mater. Sci. Eng. R Reports, vol. 19, No. 3-4, pp. 87-151, 1997.

Nandakumar, S. et al., "Physics-based switching model for Cu/SiO2/W quantum memristor", 2016 74th Annual Device Research Conference (DRC) (Jun. 19-22, 2016, Newark, DE, USA), Date Added to IEEE Xplore: Aug. 2016, 2 pages <DOI:10.1109/DRC.2016.7548509>.

National Public Radio, "Internet Of Things' Hacking Attack Led To Widespread Outage Of Popular Websites," <http://www.npr.org/2016/10/22/498954197/internet-outage-update-internet-of-things-hacking-attack-led-to-outage-of-popula>, dated Oct. 22, 2016.

National Science Foundation "Award No. 1507670," <https://www.nsf.gov/awardsearch/showAward?AWD_ID=1507670> publicly available at least as early as Jun. 28, 2017.

National Science Foundation, "Award No. 1506836," <https://www.nsf.gov/awardsearch/showAward?AWD_ID=1506836> publicly available at least as early as Jun. 28, 2017.

Nesheva, C. Raptis, A. Perakis, I. Beneva, Z. Aneva, Z. Levi, S. Alexandrova, H. Hofmeister, Raman scattering and photoluminescence from Si nanoparticles in annealed SiOx thin films, J. Appl. Phys., vol. 92, No. 8, pp. 4678-4683 (2002).

Nessel, R. Q. Lee, C. H. Mueller, M. N. Kozicki, M. Ren, and J. Morse, "A novel nanoionics-based switch for microwave applications," IEEE MTT-S Int. Microw. Symp. Dig., pp. 1050-1054, 2008.

Nili et al., "Donor-induced performance tuning of amorphous SrTiO3 memristive nanodevices: Multistate resistive switching and mechanical tunability," Advanced Functional Materials, vol. 25, No. 21, pp. 3172-3182, 2015.

(56) References Cited

OTHER PUBLICATIONS

Nili et al., "Nanoscale resistive switching in amorphous perovskite oxide (a-SrTiO3) memristors," Advanced Functional Materials, vol. 24, No. 43, pp. 6741-6750, 2014.

Nili, H. et al., "Highly-Secure Physically Unclonable Cryptographic Primitives Using Nonlinear Conductance and Analog State Tuning in Memristive Crossbar Arrays", arXiv, Submitted Nov. 23, 2016, 25 pages, arXiv:1611.07946v1.

Nosé (1984). A unified formulation of the constant temperature molecular-dynamics methods. Journal of Chemical Physics. 81 511-519 (1984).

Novikov, V. A. Gritsenko, Short-range order in amorphous SiOx by x-ray photoelectron spectroscopy, J. Appl. Phys. 110, 014107 (2011).

O'Leary, J. H. Thomas, Characterization of reactively evaporated SiOx thin films, Journal of Vacuum Science & Technology A 5, 106 (1987).

Oakeshott and A. MacKinnon, Numerical evaluation of current paths in disordered media, J. Phys.: Condens. Matter 6, 1513 (1994).

Ohio University, "Honors Tutorial College," <https://www.ohio.edu/honors> publicly available at least as early as Apr. 3, 2017.

Oren et al., "On the effectiveness of the remanence decay side-channel to clone memory-based PUFs," in International Workshop on Cryptographic Hardware and Embedded Systems, 2013, pp. 107-125.

Ori, C. Massobrio, A. Bouzid, B. Coasn, Surface of glassy GeS2: a model based on a first principles approach, Phys. Rev. B 90 045423 (2014).

Oxford Instruments, "Basic PECVD Plasma Processes," <https://nanolab.berkeley.edu/process_manual/chap6/6.20PECVD.pdf> dated 2003.

Oxley, Electroforming, switching and memory effects in oxide thin films. Act. Passive Electron. Compon. 3, 217, 1977.

P. B. Allen, "Electron Transport" in Contemporary Concepts of Condensed Matter Science, Conceptual Foundations of Materials: A Standard Model for Ground- and Excited-State Properties (2006).

Pai, S. S. Chao, Y. Takagi, G. Lucovsky, Infrared spectroscopic study of SiOx films produced by plasma enhanced chemical vapor deposition, J. Vac. Sci. Technol. A 4 (3) May/Jun. 1986.

Pandey, N. Podraza and D. A. Drabold, Electrical activity of boron and phosphorous in hydrogenated amorphous silicon, Phys. Rev. Applied 2 054005 (2014).

Pandey, P. Biswas and D. A. Drabold, Inversion of diffraction data for amorphous materials, Scientific Reports, 6 33731 (2016).

Pandey, P. Biswas and D. A. Drabold, Realistic inversion of diffraction data for an amorphous solid: the case of silicon, Phys. Rev B 94 235208 (2016).

Pandey, P. Biswas and D. A. Drabold, Force enhanced atomic refinement: application to amorphous silica and amorphous silicon, Phys. Rev. B 92 155205 (2015).

Papiora, N. Lorente, T. Frederiksen, A. García, M. Brandbyge, Improvements on non-equilibrium and transport Green function techniques: The next-generation transiesta, Comp. Phys. Comm. 212, 8-24 (2017).

Park, K.S. Kim, M.H. Jung, WJ Cho and J. Jung, Electrical Characteristics of SiO2/High-k Dielectric Stacked Tunnel Barriers for Nonvolatile Memory Applications. Journal of The Korean Physical Society vol. 55. 10.3938/jkps.55.116 (2009).

Pearton, W. H. Heo, M. Ivill, D. P. Norton, and T. Steiner, "Dilute magnetic semiconducting oxides," Semicond. Sci. Technol., vol. 19, No. 10, pp. R59-R74, 2004.

Pelgrom et al., "Matching properties of MOS transistors," IEEE Journal of solid-state circuits, vol. 24, No. 5, pp. 1433-1439, 1989.

Perdew, K. Burke, and M. Ernzerhof, Phys. Rev. Lett. 77, 3865 (1996).

Pliskin, Comparison of properties of dielectric films deposited by various methods, Journ. Of Vac. Sci. and Tech., vol. 14, No. 5, pp. 1064-1081, Sep./Oct. 1977.

Prabhu et al., Extracting Device Fingerprints from Flash Memory by Exploiting Physical Variations; 4th int. conf. on Trust and trustworthy computing; Jun. 2011.

Prasai et al., High precision detection of change in intermediate range order of amorphous zirconia-doped tantala thin films due to annealing, Phys. Rev. Lett. 123 045501 (2019).

Prasai, G. Chen and D. A. Drabold, Amorphous to amorphous insulator-metal transition in GeSe:Ag glasses, Phys. Rev. Materials 1 015603 (2017).

Prasai, P. Biswas and D. A. Drabold, Electronically designed amorphous carbon and silicon, Phys. Stat. Sol. A 213 1653 (2016).

Prasai, P. Biswas and D. A. Drabold, Electrons and Phonons in Amorphous Semiconductors, invited Topical Review in: Semicon. Sci. Tech. 31 073002 (2016).

Prasai, P. Biswas and D. A. Drabold, Sculpting the band gap, a computational approach, Scientific Reports, 5 15522 (2015).

Prasai, P. Biswas, K. Subedi, K, Ferris and D. A. Drabold, Spatial projection of electronic conductivity, the example of conducting bridge computer memory, PSS Rapid Research Letters, https://doi.org/10.1002/pssr.201800238 (2018).

Prezioso et al., "Training and operation of an integrated neuromorphic network based on metal-oxide memristors," Nature, vol. 521, No. 7550, pp. 61-64, 2015.

Price et al., How to Generate Repeatable Keys Using PUF, Correcting PUF Errors with Iteratively Broadening and Prioritized Search; International Association for Cryptologic Research, CHES 2014.

Puthentheradam, S. et al., "Inherent diode isolation in programmable metallization cell resistive memory elements", Applied Physics A, Jan. 2011, vol. 102, pp. 817-826 <DOI:10.1007/s00339-011-6292-5>.

Rajendran et al., "Nano meets security: Exploring nanoelectronic devices for security applications," Proceedings of the IEEE, vol. 103, No. 5, pp. 829-849, 2015.

Rajendran et al., "Nano-PPUF: A memristor-based security primitive," in IEEE Computer Society Annual Symposium on VLSI (ISVLSI), 2012, pp. 84-87.

Ramírez-Ortiz et al., "A catalytic application of Cu2O and CuO films deposited over fiberglass," Appl. Surf. Sci., vol. 174, No. 3-4, pp. 177-184, 2001.

Ranasinghe et al., "Confronting security and privacy threats in modern RFID systems," in Fortieth Asilomar Conference on Signals, Systems and Computers (ACSSC), 2006, pp. 2058-2064.

Razavi, "The StrongARM latch: A circuit for all seasons," IEEE Solid-State Circuits Magazine, vol. 7, No. 2, pp. 12-17, 2015.

Razi et al., Space-Time Block Codes Assisted by Fast Turbo Codes; WiCOM '08. 2008. 1-6.

Razi et al.; Binary Source Estimation Using a Two-Tiered Wireless Sensor Network; Communications Letters, IEEE 15, No. 4 (2011): 449-451.

Remachea, E. Fourmonda, A. Mahdjoubb, J. Dupuisa, M. Lemitia, Design of porous silicon/PECVD SiOx antireflection coatings for silicon solar cells, Materials Science and Engineering B 176 (2011), pp. 45-48.

Rose et al., "A write-time based memristive PUF for hardware security applications," in IEEE/ACM International Conference on Computer-Aided Design (ICCAD), 2013, pp. 830-833.

Rosenfeld et al., Sensor Physical Unclonable Functions; IEEE HOST, pp. 112-117, 2010.

Rostami et al., "Robust and reverse-engineering resilient PUF authentication and key-exchange by substring matching," IEEE Transactions on Emerging Topics in Computing, vol. 2, No. 1, pp. 37-49, 2014.

Rueppel, "Correlation immunity and the summation generator," in Advances in Cryptology—CRYPTO'85 Proceedings, 1985, pp. 260-272.

Rührmair et al., "Applications of high-capacity crossbar memories in cryptography," IEEE Transactions on Nanotechnology, vol. 10, No. 3, pp. 489-498, 2011.

Rührmair et al., "Modeling attacks on physical unclonable functions," in Proceedings of the 17th ACM Conference on Computer and Communications Security, 2010, pp. 237-249.

Rührmair et al., "PUF modeling attacks on simulated and silicon data," IEEE Transactions on Information Forensics and Security, vol. 8, No. 11, pp. 1876-1891, 2013.

(56) References Cited

OTHER PUBLICATIONS

Rührmair et al., "Strong PUFs: models, constructions, and security proofs," in Towards Hardware—Intrinsic Security. Springer, 2010, pp. 79-96.
Schindler, M. Weides, M. N. Kozicki, R. Waser, Low current resistive switching in Cu—SiO2 cells, Appl. Phys. Lett. 92, 122910 (2008).
Shallenberger, Determination of chemistry and microstructure in SiOx ($0.1<x<0.8$) films by x-ray photoelectron spectroscopy, Journal of Vacuum Science & Technology A 14, 693 (1996).
Simmons, R. R. Verderber, New thin-film resistive memory, The Radio and Electronic Engineer, Aug. 1967.
Škorić et al., "Robust key extraction from physical uncloneable functions," in Applied Cryptography and Network Security, 2005, pp. 407-422.
Soler, E. Artacho, J. D. Gale, A. García, J. Junquera, P. Ordejón, and D. Sánchez-Portal, The SIESTA method for ab-initio order-N materials simulation J. Phys.: Condens. Matt. 14, 2745-2779 (2002).
Sopinskyy, V. Khomchenko, Electroluminescence in SiOx films and SiOx-film-based systems, Current Opinion in Solid State and Materials Science 7 (2003) 97-109.
Stanford University, "LIGO Group," <https://lvc.sites.stanford.edu/> publicly available at least as early as Jun. 26, 2020.
Štich, M. C. Payne, R. D. King-Smith, J-S. Lin, and L. J. Clarke Ab initio total-energy calculations for extremely large systems: Application to the Takayanagi reconstruction of Si(111) Phys. Rev. Lett. 68, 1351 (1992).
Strukov, "Endurance-write speed tradeoffs in nonvolatile memories," Applied Physics A, vol. 122, No. 4, pp. 1-4, 2016.
Su et al., "A digital 1.6 pJ/bit chip identification circuit using process variations," IEEE Journal of Solid-State Circuits, vol. 43, No. 1, pp. 69-77, 2008.
Subedi, K. Prasai, D. A. Drabold, "Space-projected conductivity and the spectral properties of the conduction matrix," Physica Status Solidi B, 2020, 2000438.
Subedi, K. Prasai, M. N. Kozicki, and D. A. Drabold, Structural origins of electronic conduction in amorphous copper-doped alumina, Phys. Rev. Materials 3 065605 (2019).
Suh et al., "Physical unclonable functions for device authentication and secret key generation," in Proceedings of the 44th annual Design Automation Conference, 2007, pp. 9-14.
Suzuki, Y. Ishikawa, M. Isshiki, and Y. Waseda, "Native Oxide Layers Formed on the Surface of Ultra High-Purity Iron and Copper Investigated by Angle Resolved XPS," Mater. Trans. JIM, vol. 38, No. 11, pp. 1004-1009, 1997.
Tajik et al., "Physical characterization of arbiter PUFs," in International Workshop on Cryptographic Hardware and Embedded Systems, 2014, pp. 493-509.
Takayanagi, S. Akao, T. Yanagisawa, N. Nakaso, Y. Tsukahara, S. Hagihara, T. Oizumi, N. Takeda, T. Tsuji, K. Yamanaka, Detection of Trace Water Vapor Using SiOx-Coated Ball SAW Sensor, Materials Transactions, vol. 55, No. 7 (2014) pp. 988 to 993, 2014 The Japanese Society for Non-Destructive Inspection.
Thapa, B. Bhattarai, M. N. Kozicki, K. N. Subedi and D. A. Drabold, Structure and charge transport of amorphous Cu-doped tantalum pentoxide: an ab initio study, Phys. Rev. Materials 4 064603 (2020).
Tomozeiu, Electrical conduction and dielectric relaxation of a-SiOx (0bxb2) thin films deposited by reactive RF magnetron sputtering, Thin Solid Films 516 (2008) 8199-8204.
Tsunoda et al., "Low power and high speed switching of Ti-doped NiO ReRAM under the unipolar voltage source of less than 3 V," in IEEE International Electron Devices Meeting (IEDM), 2007, pp. 767-770.
U.S. Appl. No. 17/025,523, filed Sep. 18, 2020, Kozicki.
U.S. Appl. No. 17/050,750, filed Oct. 26, 2020, Kozicki et al.
U.S. Appl. No. 17/072,701, filed Oct. 16, 2020, Kozicki.
U.S. Appl. No. 17/100,028, filed Nov. 20, 2020, Kozicki.

Valov et al., "Electrochemical metallization memories—Fundamentals, applications, prospects," Nanotechnology, vol. 22, p. 254003, 2011.
Valov et al., "Nanobatteries in redox-based resistive switches require extension of memristor theory," Nature Communications, vol. 4, p. 1771, 2013.
Van der Leest et al., "Anti-counterfeiting with hardware intrinsic security," in IEEE Design, Automation & Test in Europe Conference & Exhibition (DATE), 2013, pp. 1137-1142.
Van Hapert, Hopping Conduction and Chemical Structure, a study on Silicon Suboxides, PhD Thesis, Universiteit Utrecht, 2012, ISBN 90-393-3063-8.
Vatajelu et al., STT-MRAM-Based PUF Architecture exploiting Magnetic Tunnel Junction Fabrication-Induced Variability; ACM J. Emerging Tech. in Comp Sys.; 13(1):5, May 2016.
Wang, Yang Yang, Jae-Hwang Lee, Vera Abramova, Huilong Fei, Gedeng Ruan, Edwin L. Thomas, James M. Tour, Nanoporous Silicon Oxide Memory, Nano Lett. 2014, 14, 4694-4699.
Waser et al., "Nanoionics-based resistive switching memories," Nature Materials, vol. 6, No. 11, pp. 833-840, 2007.
Waser et al., "Redox-based resistive switching memories—nanoionic mechanisms, prospects, and challenges," Advanced materials, vol. 21, No. 25-26, pp. 2632-2663, 2009.
Webster et al., "On the design of S-boxes," in Advances in Cryptology—CRYPTO'85 Proceedings, 1985, pp. 523-534.
Willers et al., MEMS-based gyroscope as PUFs; CCS'16, Oct. 24-28, 2016, pp. 591-602.
Wong et al., "Memory leads the way to better computing," Nature Nanotechnology, vol. 10, No. 3, pp. 191-194, 2015.
Yang et al., Adaptive Quantization Using Piecewise Companding and Scaling for Gaussian Mixture; Visual Communication and Image Representation. 2012.
Yang, Y. et al., "Novel Complementary Resistive Switch Crossbar Memory Write and Read Schemes", IEEE Transactions on Nanotechnology, Mar. 2015 [IEEE Date of Publication: Jan. 2015], vol. 14, No. 2, pp. 346-357 <DOI:10.1109/TNANO.2015.2394450>.
Yasser Alajerami, David Drabold, Mohamed Mhareb, Katherine Lesslee, Gang Chen, and Kashi Subedi, Physical, Structural and Shielding properties of Cadmium Bismuth Borate-Based glasses, J. App. Physics 127 175102 (2020).
Yoshida, I. Umezu, N. Sakamoto, M. Inada, A. Sugimura, Effect of structure on radiative recombination processes in amorphous silicon suboxide prepared by rf sputtering, J. Appl. Phys. 92, 5936 (2002).
Yu et al., "Secure and robust error correction for physical unclonable functions," IEEE Design Test of Computers, vol. 27, No. 1, pp. 48-65, 2010.
Zhang and D. A. Drabold, Alternative approach to computing transport coefficients: application to conductivity and Hall coefficient of hydrogenated amorphous silicon, Phys. Rev. Lett. 105 186602 (2010).
Zhang and D. A. Drabold, Electrical conductivity calculations: the role of degenerate and resonant electron states, Phys. Rev. B 81 085210 (2010).
Zhang and D. A. Drabold, Structural and electronic properties of glassy GeSe2 surfaces, Phys. Rev. B 62 15695 (2000).
Zhang and D. A. Drabold, The work done by an external electromagnetic field, J. Phys. Cond. Matter 23 085801 (2011).
Zhang and D. A. Drabold, Transport calculations in complex materials: a comparison of the Kubo formula, the Kubo-Greenwood formula and the microscopic response method, Phys Rev E 83 012103 (2011).
Zhang et al., "A PUF-FSM binding scheme for FPGS IP protection and pay-per-device licensing," IEEE Transactions on Information Forensics and Security, vol. 10, No. 6, pp. 1137-1150, 2015.
Zhang et al., "Exploiting process variations and programming sensitivity of phase change memory for reconfigurable physical unclonable functions," IEEE Transactions on Information Forensics and Security, vol. 9, No. 6, pp. 921-932, 2014.
Zhang et al., "Optimizating emerging nonvolatile memories for dual-mode applications: Data storage and key generator," IEEE Transactions on Computer-Aided Design of Integrated Circuits and Systems, vol. 34, No. 7, pp. 1176-1187, 2015.

(56) References Cited

OTHER PUBLICATIONS

Zhang et al.,, "Highly reliable spin-transfer torque magnetic ram-based physical unclonable function with multi-response-bits per cell," IEEE Transactions on Information Forensics and Security, vol. 10, No. 8, pp. 1630-1642, 2015.

Zheng, C. N. Xu, E. Tanaka, Y. Tomokiyo, M. Suzuki, and E. S. Otabe, "Charge-spin-orbital coupling in CuO," Phys. C Supercond., vol. 357-360, pp. 181-185, 2001.

Zhou, Tao Du, Lijie Guo, Morten M. Smedskjaer, Mathieu Bauchy, New insights into the structure of sodium silicate glasses by force-enhanced atomic refinement, J. Non. Cryst. Sol. 536 120006 (2020).

United States Patent Office Action for U.S. Appl. No. 17/025,523 dated Jul. 1, 2021 (14 pages).

English Machine Translation of Kang et al. (KR101566949B1) dated Jun. 30, 2014. (Year: 2014).

PHYSICAL UNCLONABLE FUNCTIONS WITH SILICON-RICH DIELECTRIC DEVICES

CROSS-REFERENCE TO RELATED APPLICATIONS

This application is a non-provisional of and claims benefit of U.S. Provisional Application No. 62/945,683, filed on Dec. 9, 2019, the entire contents of which are incorporated herein by reference.

STATEMENT REGARDING FEDERALLY SPONSORED RESEARCH OR DEVELOPMENT

This invention was made with government support under 1827753 awarded by the National Science Foundation. The government has certain rights in the invention.

BACKGROUND

Internet security has become increasingly important, in part because of the rapidly growing internet of things ("IoT"). Many IoT devices communicate on open networks with little or no security, making them vulnerable to network intrusion including, for example, distributed denial of service ("DDoS") attacks. Most IoT devices, however, are based on low-power system on a chip ("SOC") designs. Thus, full security on these IoT devices is preferably implemented with as little circuit overhead or additional power consumption as possible to meet operational requirements.

Current secure communications require random number generation to create a secure key. The security of the key is directly related to the randomness of the number generation. Various software approaches have been used to generate pseudo-random binary sequences ("PRBS"), but these can be cracked with sufficient computing power. Alternatively, naturally occurring randomness in semiconductor device characteristics can provide random number generation via appropriate reading circuitry from within an integrated circuit, for example, with the generated number being unique to each circuit. This has been demonstrated with static random access memory ("SRAM") and resistive random access memory ("RRAM"). Arrays of these type of memories have been used as generators of Physical Unclonable Functions ("PUFs").

In securing IoT devices with integrated hardware, it is important that the technology operates at very low-energy to preserve the often-limited power sources used and to prevent side-channel attacks by, for example, a differential power analysis which extracts security information from patterns of power usage by the circuitry. It is also important that the additional circuitry does not add significant cost to the protected component, as edge devices are often deployed in large numbers and higher individual device costs will lead to much larger overall system cost. To achieve the above-noted important requirements, PUF technology should be able to be easily integrated with CMOS logic, using existing materials and processes with few additional masking layers.

SUMMARY

The present disclosure provides silicon suboxide ("$SiO_x$") structures and methods of creating silicon suboxide structures for dielectric devices. The security of the Internet of Things ("IoT") is questionable and is exceptionally vulnerable to denial of service-based attacks. To secure the IoT, a method of producing physical tags that serve as unique identifiers and keys is needed. This technology provides a method of stochastically creating these keys with $SiO_x$. Unlike previous technologies, this technology does not require transition metals to function, and the properties of the $SiO_x$ structures can be controlled by modulating thickness, area, and oxidation.

For example, the present disclosure provides a system for physical unclonable function ("PUF") generation. In one implementation, the system includes a plurality of PUF devices and an electronic controller. Each of the plurality of PUF devices include a first electrochemically-inactive electrode, a second electrochemically-inactive electrode, and a layer of silicon suboxide. The layer of silicon suboxide is positioned directly between the first electrochemically-inactive electrode and the second electrochemically-inactive electrode. The electronic controller is communicably coupled to the plurality of PUF devices. The electronic controller is configured to read binary values associated with the plurality of PUF devices.

The present disclosure also provides a physical unclonable function ("PUF") device. In one implementation, the PUF includes a first electrochemically-inactive electrode, a second electrochemically-inactive electrode, and a layer of silicon suboxide. The layer of silicon suboxide is positioned directly between the first electrochemically-inactive electrode and the second electrochemically-inactive electrode.

The present disclosure further provides a method for manufacturing a physical unclonable function ("PUF") device. The method includes depositing a first electrochemically-inactive electrode. The method also includes depositing a layer of silicon suboxide onto the first electrochemically-inactive electrode. The method further includes depositing a second electrochemically-inactive electrode onto the layer of silicon suboxide such that the layer of silicon suboxide is positioned directly between the first electrochemically-inactive electrode and the second electrochemically-inactive electrode.

The PUF devices disclosed herein exhibit stochastic behavior from device-to-device that is not dependent on process variations but is instead due to the entropy of the material formation process and the resulting atomic structure of the materials. In addition, the PUF devices disclosed herein exhibit stable characteristics over time at reasonable operating temperatures (e.g., up to 125° C.). Further, the PUF devices disclosed herein operate at low voltage (e.g., 1 volt) and current (e.g., 100 nanoamps). In addition, the PUF devices disclosed herein are compatible with standard CMOS processing and equipment.

Other aspects of the invention will become apparent by consideration of the detailed description and accompanying drawings.

DETAILED DESCRIPTION

Figure 1A:
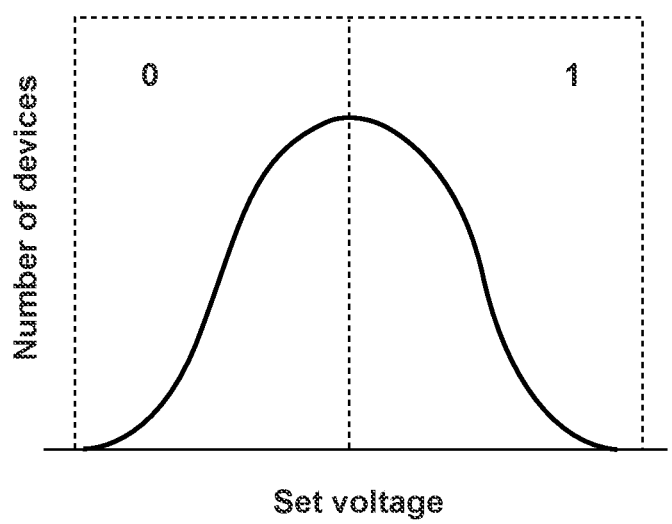
FIG. 1A is graph of an example of a distribution of a set voltage for a memory array with contiguous 0 and 1 ranges.

Before any implementations of the present disclosure are explained in detail, it is to be understood that the present disclosure is not limited in its application to the details of construction and the arrangement of components set forth in the following description or illustrated in the following drawings. The invention is capable of other implementations and of being practiced or of being carried out in various ways.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)", "include(s)", "having", "has", "can", "contain(s)", and variants thereof, as used herein, are intended to be open-ended transitional phrases, terms, or words that do not preclude the possibility of additional acts or structures. The singular forms "a", "and", and "the" include plural references unless the context clearly dictates otherwise. The present disclosure also contemplates other embodiments "comprising", "consisting of", and "consisting essentially of", the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4". The term "about" may refer to plus or minus 10% of the indicated number. For example, "about 10%" may indicate a range of 9% to 11%, and "about 1%" may mean from 0.9-1.1. Other meanings of "about" may be apparent from the context, such as rounding off, so, for example "about 1" may also mean from 0.5 to 1.4.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrase "at least one of A, B, . . . and N" or "at least one of A, B, . . . N, or combinations thereof" are defined in the broadest sense to mean one or more elements selected from the group comprising A, B, . . . and N, that is to say, any combination of one or more elements A, B, . . . or N including any one element alone or in combination with one or more of the other elements, which may also include, in combination, additional elements not listed.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

For purposes of this disclosure, the chemical elements are identified in accordance with the Periodic Table of the Elements (CAS version) and the Handbook of Chemistry and Physics (98th Ed., inside cover).

The term "silica," as used herein unless otherwise defined, means silicon suboxide ("$SiO_x$"), where x may range from greater than or equal to 1 to less than or equal to 2. More particularly, the term "silica" may refer to $SiO_x$ where x equals a single value (within normal experimental tolerance) from 1 to 2, or "silica" may refer to $SiO_x$ where x is a mixture of values from 1 to 2. Even more particularly, the term "silica" may refer to $SiO_x$ where x equals about 1.3.

The term "silicon suboxide," as used herein unless otherwise defined, means $SiO_x$, where x may range from greater than 1 to less than 2. More particularly, the term "silicon suboxide" may refer to $SiO_x$ where x equals a single value (within normal experimental tolerance) between 1 to 2, or "silicon suboxide" may refer to $SiO_x$ where x is a mixture of values between 1 to 2. Even more particularly, the term "silicon suboxide" may refer to $SiO_x$ where x equals about 1.3.

A physical unclonable function ("PUF") can be embodied in a physical structure, such as a memory array, and has the characteristic of being easy to evaluate but hard to predict due to the randomness of the underlying mechanism. For practical security applications, a PUF system should be simple to make but difficult to duplicate, even when the exact manufacturing process that produced it is known. Randomness occurs naturally at the nanoscale in materials that make up memory arrays, which leads to randomly distributed cell characteristics in these devices.

Figure 1B:
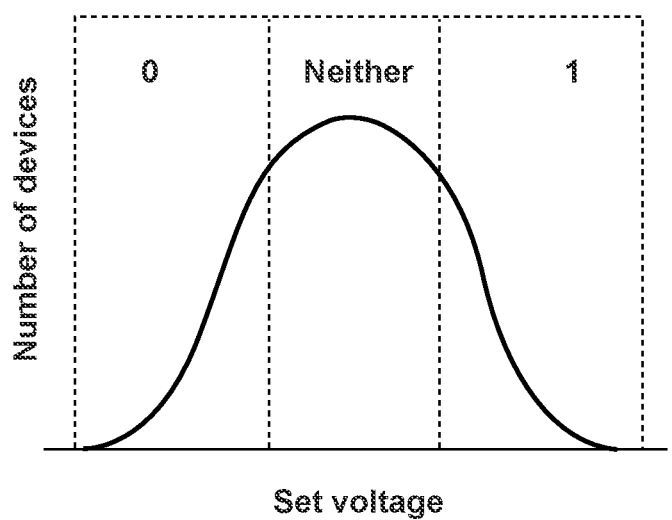
FIG. 1B is graph of an example of a distribution of a set voltage for a memory array with 0 and 1 ranges separated by a third state.

Programmable resistance devices exhibit subtle random differences in operational parameters from cell-to-cell, due to the stochastic nature of the formation of the conducting pathway. For example, the voltage at which the devices transition from a high resistance "off" state to a low resistance "on" state (i.e., the set voltage) varies randomly across an array of devices. This parameter can be partitioned into ranges representing logic 0 and logic 1. For example, FIG. 1A is a one example of a graph that illustrates a voltage range petitioned into a first range below a set voltage that represents logic 0 and a second range above the set voltage that represents logic 1. This parameter can also be partitioned with an intermediate state being defined in an intervening range. For example, FIG. 1B is a one example of a graph that illustrates a voltage range petitioned into a first range that represents logic 0, a second range that represents logic 1, and a third range that represents neither logic 0, nor logic 1. In this approach, the length of a random word is directly proportional to the size of the array.

PUFs can strengthen the authentication methods of Internet of things ("IoT") elements, because they act as "digital signatures" of the hardware; to support security protocols PUFs can also operate as data-base-free authentication devices, as no secret keys or passwords have to be stored in the IoT; the cost structure of most PUFs is, in general, very low. PUFs exploit intrinsic manufacturing variations introduced during the fabrication of the electronic components of the IoTs. Variations such as critical dimensions, doping levels of semiconducting layers, and threshold voltages make each component unique and identifiable from each other. The PUF's underlying mechanism is the creation of a large number of challenges (i.e., input), responses (i.e., output), and pairs (called CRPs) which are unique to each device. Once deployed during the authentication cycles, PUFs are queried with challenges. The authentication is granted when the rate of correct matching responses is statistically high enough. PUFs can be generated with several components, such as ring oscillators and circuits with gate delays with field-programmable gate array ("FPGA"), static random access memories ("SRAMs"), sensors and microelectromechanical systems ("MEMS") devices, Flash memories, magnetic memories, and various resistive random access memory ("RAM") components.

However, PUFs can have (i) a lack of stability of the physical parameters that creates high error rates due to natural drifts or noisy conditions, and (ii) insufficient secret properties of the PUFs that make them vulnerable through side channel analysis by hackers. PUFs based on existing technologies often struggle to deliver in these two areas, and this is because these two limitations are often in conflict with each other: strong PUFs can have low error rates but be too easy to analyze, while weak PUFs can have high error rates and be well protected from side channel analysis.

A PUF system can be based on memory in an array relating to resistive memory devices that use a silicon-rich silicon suboxide layer sandwiched between a copper electrode and an electrochemically-inactive electrode. The silicon-rich suboxide layer allows the copper to be readily incorporated in the dielectric, and thus facilitates the resistance switching effect via the formation and removal of a copper-rich conducting region. Whereas this follows the trend of various RRAM-based PUFs, the inherent plasticity of such devices might not be suitable for all forms of PUF, particularly those which rely on different characteristics from device-to-device but extremely stable characteristics for each individual device. For example, if an array of such elements was used to generate a key by applying a small voltage, (e.g., around 1 volt) to each device and then reading the current, (or applying a small current, e.g., 100 nanoamps, and then reading the voltage), and then using the variations in current (voltage) to generate a digital key as shown in FIGS. 1A and 1B, then this array should return exactly the same key every time it was queried. The motion of the copper in the oxide, especially at elevated temperature over time, would make read-to-read variations on the same device likely, and hence the stability of the key would be adversely affected. Note that the mode of operation described in system type of PUF system, in which each device is "reset" prior to interrogation, would largely mitigate this issue, but this involves additional programming steps which may slow the operation of the system.

Figure 2:
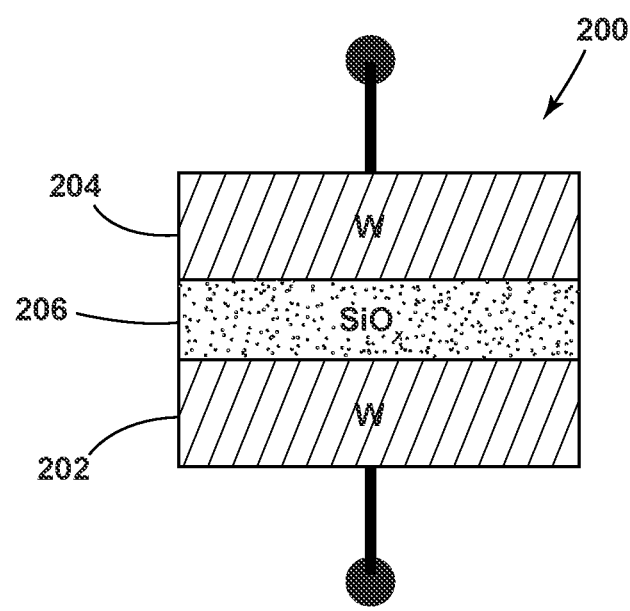
FIG. 2 is a block diagram of one example of a PUF device in accordance with some implementations of the present disclosure.

FIG. 2 is a diagram of an example of a PUF device 200. The PUF device 200 has a metal-insulator-metal ("MIM") stack configuration, which is the most compact and easiest to fabricate, leading to low manufacturing costs. The PUF device 200 includes a first electrode 202, a second electrode 204, and an insulation layer 206. The first electrode 202 and the second electrode 204 include one or more electrochemically-inactive elements that do not supply mobile metal ions into the insulation layer 206. No mobile metals (e.g., copper or silver) are included in the first electrode 202 and the second electrode 204. Further, no mobile metals are included in the insulation layer 206.

The insulation layer 206 illustrated in FIG. 2 includes a layer of silicon suboxide ("$SiO_x$") where the x value ranges from 1 to 2. In some implementations, the x value of the layer of silicon suboxide is between 1.2 and 1.6. In the implementation illustrated in FIG. 2, the first electrode 202 and the second electrode 204 include tungsten ("W"). In other implementations, the first electrode 202 and the second electrode 204 may include different electrochemically-inactive materials. For example, the first electrode 202 and the second electrode 204 may include tungsten ("W"), nickel ("Ni"), platinum ("Pt"), titanium nitride ("TiN"), tantalum nitride ("TaN"), titanium tungsten ("TiW"), or polycrystalline silicon (poly-Si).

In some implementations, the first electrode 202 and the second electrode 204 may be isolated from each other in non-device regions by a relatively thick layer of a dielectric. A variety of dielectric materials may be used for the isolation, such as thick $SiO_2$, $Si_3N_4$, or various dielectric polymers, for example. The isolation material may be formed by a variety of methods commonly known in the art.

Figure 3:
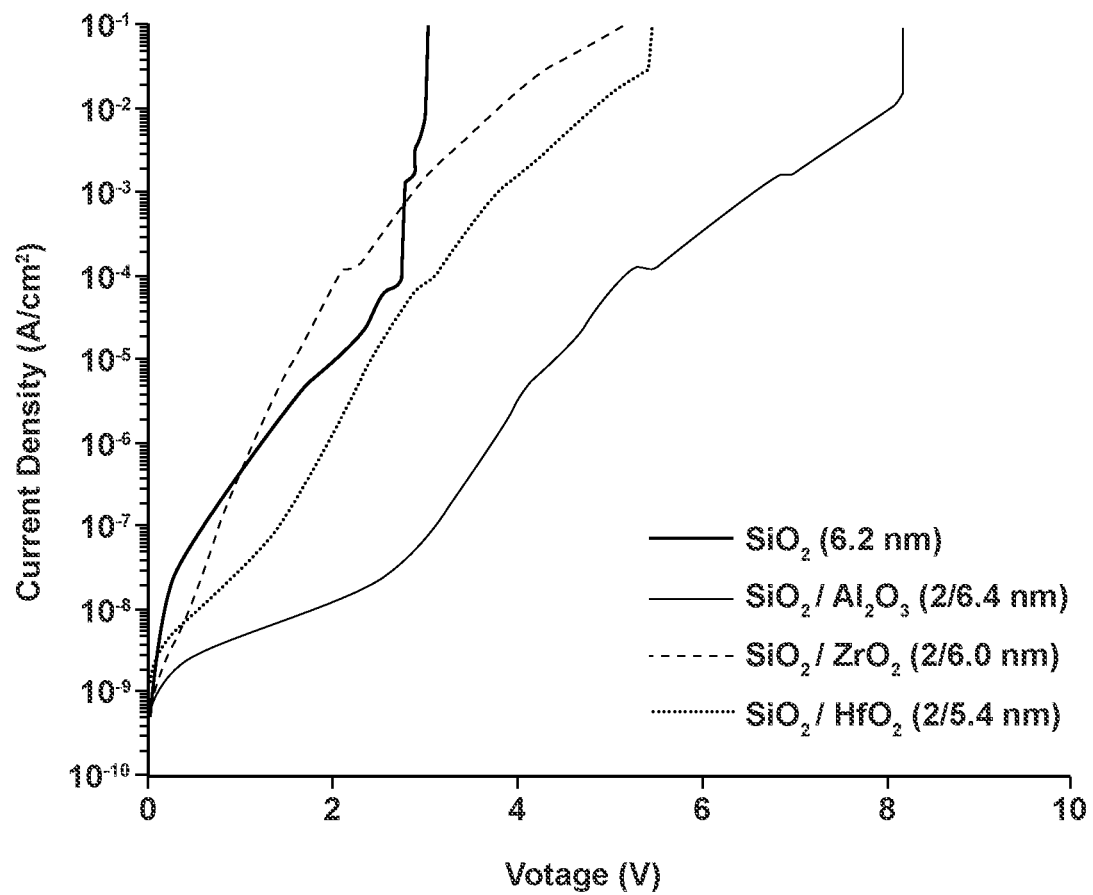
FIG. 3 is a graph of examples of tunneling current density for various oxide layers as a function of applied voltage.

Stoichiometric oxides such as $SiO_2$, although being relatively easy to form and being completely compatible with CMOS processing, are not a good option for this application due to their extremely high resistivity which significantly limits current flow. For $SiO_2$, the resistivity is in the order of $10^{15}$ $\Omega \cdot cm$ which would result in a current density of $2 \times 10^{-9}$ $A/cm^2$ at $2 \times 10^6$ $V/cm$. In thin layers (e.g., less than 10 nanometers), tunneling current will dominate so that a current density around $10^{-6}$ $A/cm^2$ will be attained for the same field (1.2 volts across a 6 nanometer thick film, as shown in FIG. 3).

In some practical applications in which the metal-insulator-metal structure is integrated along with CMOS circuitry, the area of the device may be in the order of 100 $\mu m^2$ ($10^{-6}$ $cm^2$) or less, resulting in very small current levels. For example, in a 10 micrometer by 10 micrometer device, 1 picoamp ($10^{-12}$ A) would flow due to the tunnel current, which is well below the 100 nanoamp ($10^{-7}$ A) target and is too small to be read accurately with on-chip sensing circuitry. Higher voltage across the film increases the current flow but breakdown occurs before the current density rises to any useful level. Note that the inclusion of other oxide dielectrics allows higher current densities to be attained prior to breakdown (see FIG. 3) but this exceeds the 1 volt operating target and complicates processing.

As disclosed herein, the PUF device uses a non-stoichiometric silicon-rich suboxide $SiO_x$, where, for example, 1.2<x<1.6, much like that used in a RRAM design but without the mobile metal component. This material can be deposited by physical vapor deposition ("PVD"—e.g., sputtering, co-sputtering, reactive sputtering) or chemical vapor deposition ("CVD"—e.g., low pressure CVD, plasma-enhanced CVD, remote plasma CVD), using available systems and source materials. Both of the first electrode 202 and the second electrode 204 in the structure can be tungsten, which is commonly used in the back-end-of-line in CMOS processing, or any other common electrochemically-inactive conductor (Pt, Al, TiN, TiW, doped polycrystalline silicon, etc. Thin films (e.g., between 4 nanometers and 8 nanometers) of $SiO_x$ will allow electron current to flow at relatively low voltage due to the percolation pathways formed by nanoscale silicon-rich zones, characterized by low oxygen concentration, Si—Si bonding, and higher local conductivity. The position of these zones will be random as there is no long-range order in the material and hence current flow/magnitude will be slightly different from device-to-device for a particular applied voltage and this will provide the required stochasticity. The covalent bonding (rather than ionic bonding) in the structure will make it highly rigid, providing the individual device stability required for the PUF approach described above. Note that these devices will be incapable of switching at low voltages (e.g., less than 1 volt) but the approach will still allow Cu—$SiO_x$ RRAM memory devices to be fabricated on the same IC as the PUF elements by the use of an additional mask that determines the material of one of the electrodes—oxidizable (e.g., Cu) for RRAM devices and non-oxidizable (e.g., W) for the PUF devices. Metal-free SiOx devices can exhibit a switching effect at higher voltage (e.g., greater than 1 volt) due the the migration of oxygen vacencies which leave silicon filaments that a form conducting bridge between the electrodes.

In some implementations, the thin layer of silicon suboxide may have a thickness of about 1 nanometer to about 10 nanometers, about 2 nanometers to about 9 nanometers, about 3 nanometers to about 8 nanometers, or about 4 nanometers to about 8 nanometers. In some implementations, the thin layer of silicon suboxide may have a thickness of about 1 nanometer, about 2 nanometers, about 3 nanometers, about 4 nanometers, about 5 nanometers, about 6 nanometers, about 7 nanometers, about 8 nanometers, about 9 nanometers, or about 10 nanometers.

A full switching operation may require about 3 volts and about 100 microamps for about 400 microseconds, which gives 300 microwatts and 120 nanojoules for power and energy, respectively. In some implementations, the operating current may be as low as about 10 nanoamps. In other implementations, the operating current may be as low as about 10 picoamps, such as for certain copper-silicon oxide devices.

In certain implementations, PUF generation may utilize lower power and energy because, at least in part, complete switching is not required to generate random numbers (i.e., set voltage can be determined without fully switching a device to a low resistance on state). In certain implementations, using very small currents and voltages which alter the metal concentration in a region between the electrodes, but which does not result in a continuous stable filament results in volatile device operation, which may dispose the need for pre-erase and/or post-erase steps.

Figure 4A:
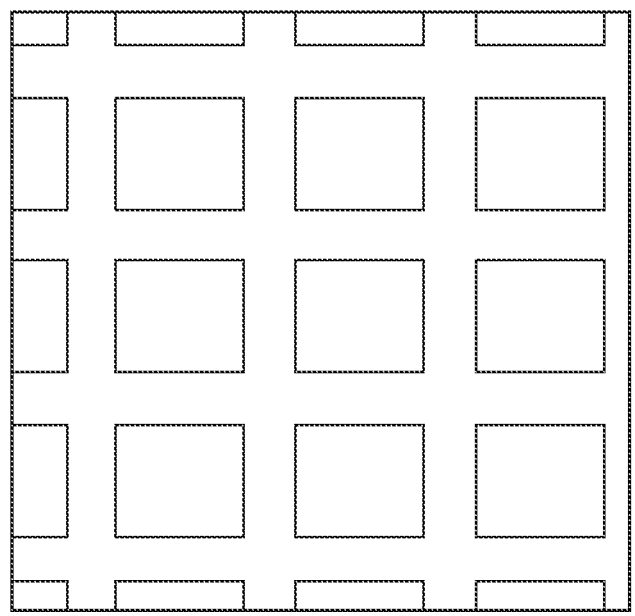
FIG. 4A is a first top view of an example of a crossbar array of PUF devices in accordance with some implementations of the present disclosure.
Figure 4B:
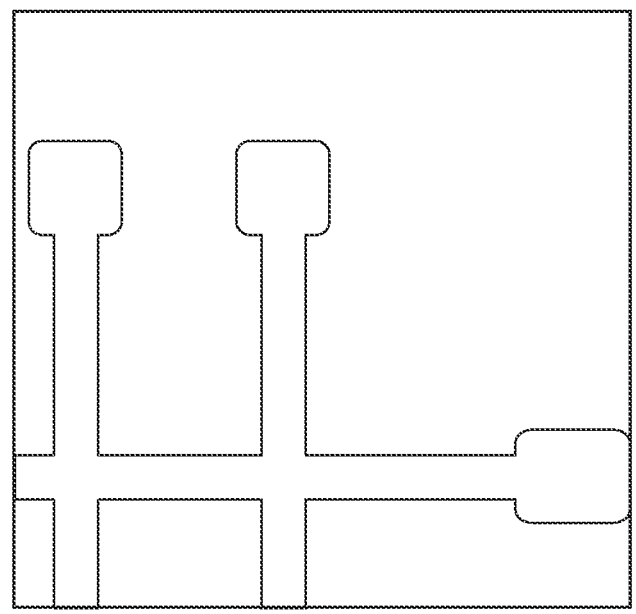
FIG. 4B is a second top view of the crossbar array of FIG. 4A.
Figure 4C:
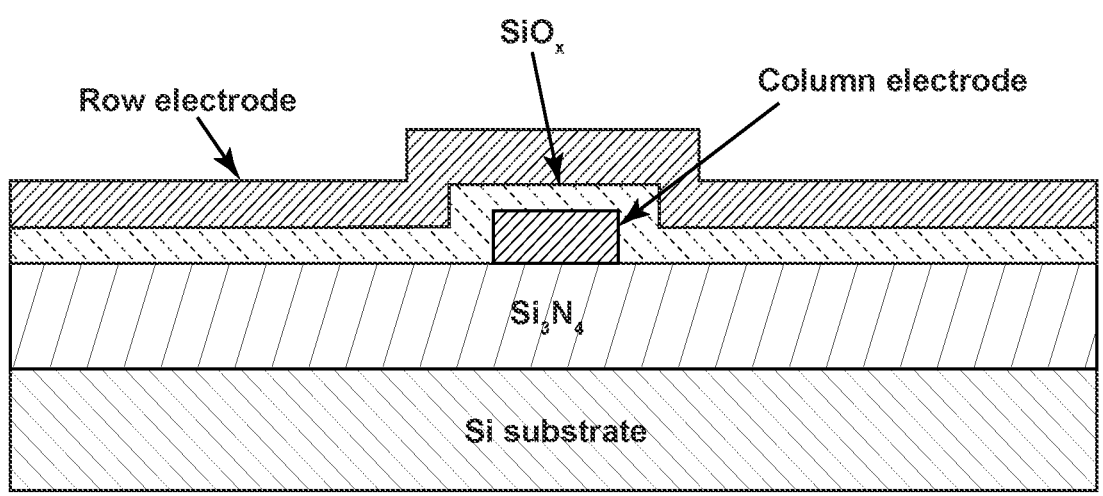
FIG. 4C is a cross-section view of a PUF device included in the crossbar array of FIG. 4A in accordance with some implementations of the present disclosure.

In some implementations, a plurality of PUF devices are arranged in a crossbar array. FIGS. 4A, 4B, and 4C illustrate an example of a crossbar array of PUF devices comprising Ni—$SiO_x$—Ni. Crossbar arrays are simple circuits comprising a number of column and row electrodes (32 of each in this case) separated by the $SiO_x$ material (e.g., 5 nanometer thick, deposited by plasma-enhanced chemical vapor deposition) so that every crossing point is a device—the 32×32 array provides 1,024 devices (=1 Kb). As illustrated in FIG. 4C, the row electrode and the column electrode may be isolated from each other in non-device regions by a relatively thick layer of a dielectric (i.e., $Si_3N_4$).

The PUF devices are quite large (30 micrometer×30 micrometer active area) but they operate in the "sweet spot" of voltage (less than 1 volt) and current (less than 1 microamp) to avoid side channel attacks by, for example, differential power analysis ("DPA"). The devices and the array can be made more compact but operate at the same current range, by either increasing the voltage slightly or decreasing the $SiO_x$ thickness in the smaller area devices. In some implementations, a slightly more silicon rich $SiO_x$ can be used to maintain current flow for the same voltage in smaller devices but there are limits to how far the oxygen content can be decreased.

Figure 5:
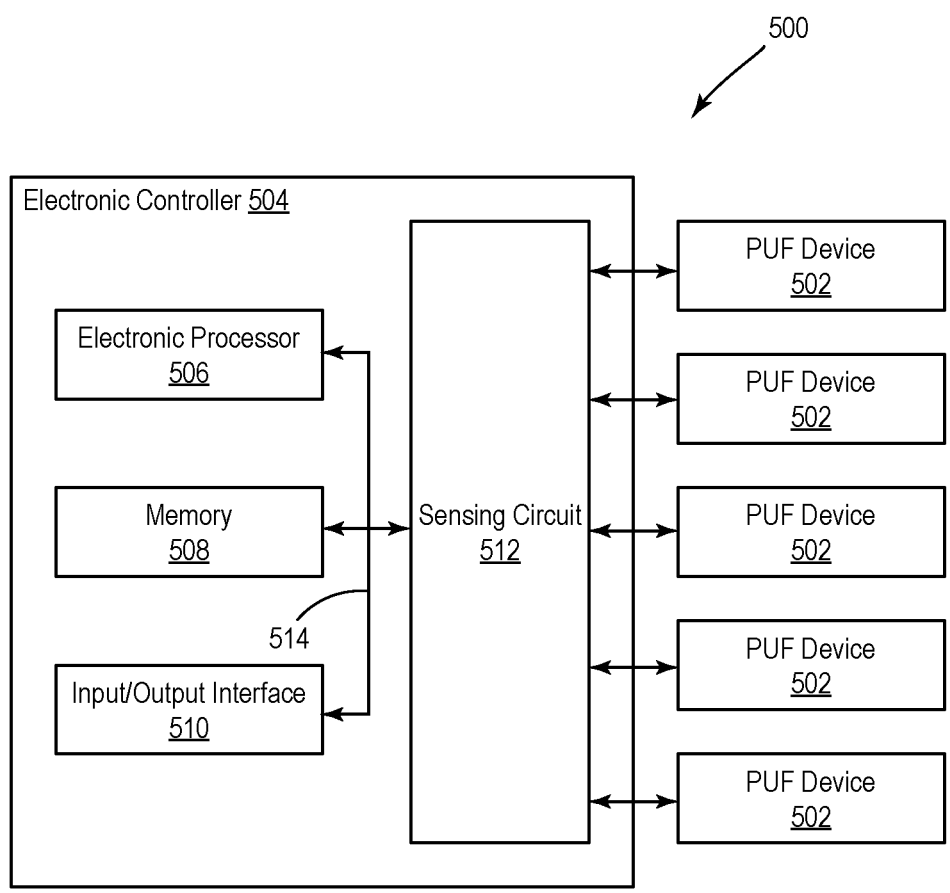
FIG. 5 is a block diagram of an example of a system for PUF generation in accordance with some implementations of the present disclosure.

FIG. 5 is a block diagram of one example of a system 500 for PUF generation. The system 500 illustrated in FIG. 5 includes a plurality of PUF devices 502 and an electronic controller 504. While five PUF devices are illustrated in FIG. 5, the system 500 may include more or less than five PUF devices. In some implementations, the plurality of PUF devices 502 are arranged in a crossbar array. In some implementations, the PUF devices 502 illustrated in FIG. 5 are the same as the PUF device 200 illustrated in FIG. 2.

The electronic controller 504 illustrated in FIG. 5 includes an electronic processor 506 (for example, one or more microprocessors, ASICs, SoCs, or other electronic controllers), memory 508, an input/output interface 510, a sensing circuit 512, and a bus 514. The bus 514 connects various components of the electronic controller 504 including, for example, the memory 508 to the electronic processor 506. The memory 508 includes read only memory ("ROM"), random access memory ("RAM"), an electrically erasable programmable read-only memory ("EEPROM"), other non-transitory computer-readable media, or a combination thereof. The electronic processor 506, in one implementation, is configured to retrieve program instructions and data from the memory 508 and execute, among other things, instructions to perform the methods described herein. Alternatively, or in addition to, the memory 508 is included in the electronic processor 506. The input/output interface 510 includes routines for transferring information between components within the electronic controller 504 and components external to the electronic controller 504. The input/output interface 510 is configured to transmit and receive signals via wires, fiber, wirelessly, or a combination thereof. Signals may include, for example, control signals, information, data, serial data, data packets, analog signals, or a combination thereof. The electronic controller 504 is communicably coupled to the PUF devices 502. The sensing circuit 512 is configured to read binary values associated with the PUF devices 502. In some implementations, the sensing circuit 512 applies voltage to all (or any subset) of the PUF devices 502 to read the binary values associated therewith. For example, the sensing circuit 512 may apply a voltage of less than or equal to 1 volt. Alternatively, or in addition, the sensing circuit 512 applies current to all (or any subset) of the PUF devices 502 to read the binary values associated therewith. For example, the sensing circuit 512 may apply a current of less than or equal to 100 nanoamps.

Figure 6:
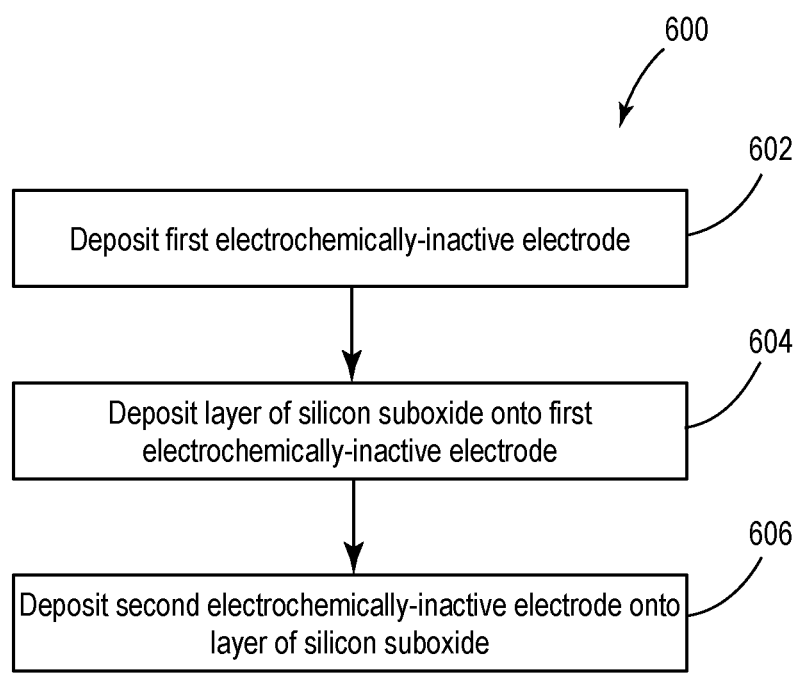
FIG. 6 is a flow diagram of an example of a method for manufacturing a PUF device in accordance with some implementations of the present disclosure.

FIG. 6 is a flow diagram of a method 600 for manufacturing a PUF device (e.g., the PUF device 200 described above in relation to FIG. 2). At block 602, a first electrochemically-inactive electrode is deposited. For example, the first electrochemically-inactive electrode is deposited onto a silicon substrate or onto a thick dielectric layer over a silicon substrate. At block 604, a layer of silicon suboxide is deposited onto the first electrochemically-inactive electrode.

In some implementations, the layer of silicon suboxide is deposited by physical vapor deposition ("PVD") (e.g., sputtering, co-sputtering, or reactive sputtering). In other implementations, the layer of silicon suboxide is deposited by chemical vapor deposition ("CVD") (e.g., low pressure CVD, plasma-enhanced CVD, or remote plasma CVD). At block 606, a second electrochemically-inactive electrode is deposited onto the layer of silicon suboxide. The second electrochemically-inactive electrode is deposited such that the layer of silicon suboxide is positioned directly between the first electrochemically-inactive electrode and the second electrochemically-inactive electrode.

The material of a PUF device, as-deposited, may have a very high resistance which can make the PUF device difficult to read. The resistance of a PUF device can be lowered without actually switching the PUF device by applying an intermediate voltage stress (e.g., around 1.2 volts). The intermediate voltage stress is sufficient to move some of the oxygen vacancies in the material and lower the PUF device's resistance so that more current flows when the PUF device is read below 1 volt. In some implementations, after the second electrochemically-inactive electrode is deposited onto the layer of silicon suboxide, an intermediate voltage stress is applied between the first electrochemically-inactive electrode and the second electrochemically-inactive electrode to lower the resistance of the PUF device. Lowering the resistance of the PUF device makes the PUF device easier to read. For example, an intermediate voltage stress may be applied to an array of PUF devices to lower the average resistance of the array.

Example 1

Initial results have been obtained from fabricated two-terminal test structures comprising thin films of $SiO_x$ deposited using an Oxford PECVD system sandwiched between sputtered inert (W, Ni) electrodes. Two different $SiO_x$ thicknesses were employed—10 nanometers and 5 nanometers. The 10 nanometer thick oxide devices returned very small currents, in the order of $10^4$ times smaller than the 5 nanometer oxide structures, which scaled with device area. This large difference in current (factor of $10^4$) for a relatively small difference in thickness (factor of 2) is due to the increase in the number of barriers the electrons have to overcome to transit the oxide. The 10 nanometer thick oxides permanently broke down around 3.5 volts. The 5 nanometer thick oxide devices returned around 1 to 100 nanoamps at 1 volt for the small diameter devices (2 to 10 micrometer diameter), with much larger currents for the very large devices. Oxide breakdown occurred around 2.5 volts for these structures. These results are shown in FIG. 7.

Figure 7:
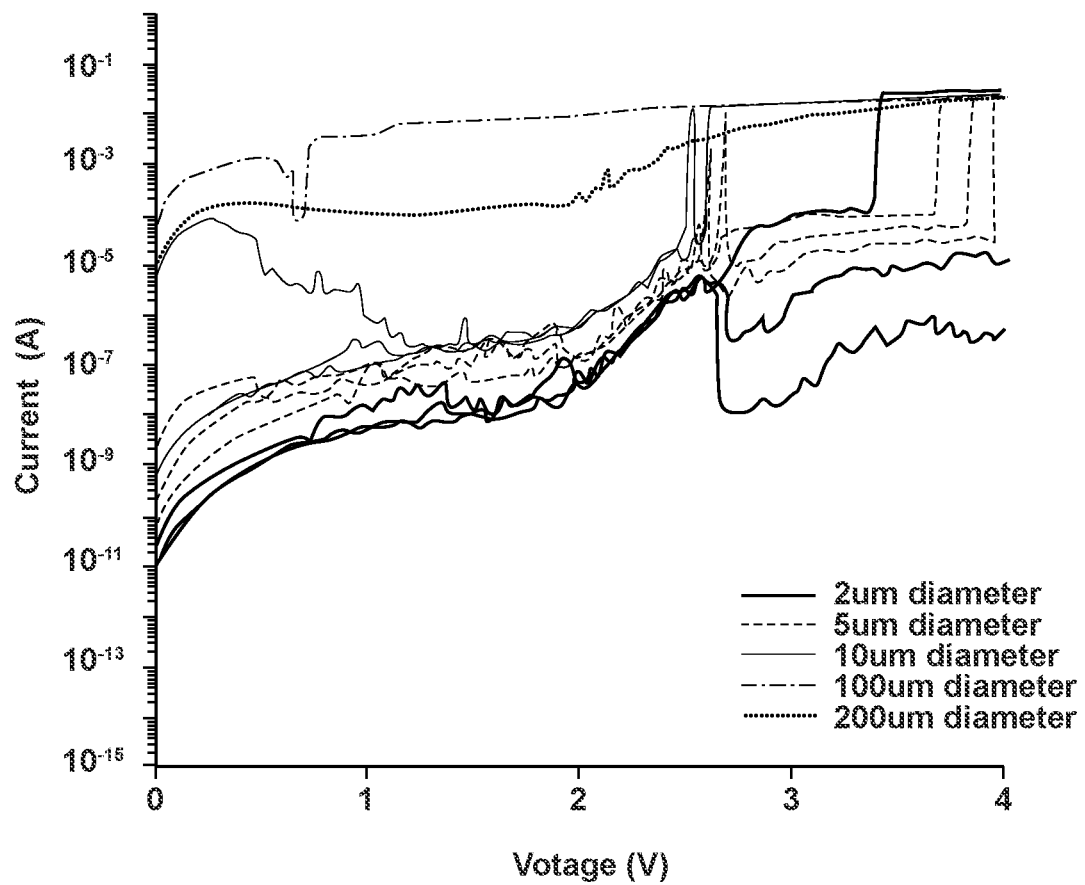
FIG. 7 is a graph of examples of current vs. voltage plots for various diameter PUF devices with 5 nanometer thick $SiO_x$.

As is evident from FIG. 7, with the deposition conditions and thickness used, the 10 micrometer diameter 5 nanometer thick oxide devices provided the desired operating point of 100 nanoamps at 1 volt. The desired operating point can be tuned by altering deposition conditions, oxide thickness, and device area with the following general trends illustrated below in Table #1. It should be noted that the general trends illustrated in Table #1 are simplified for ease of understanding and that, in practice, tuning is a lot more complicated.

TABLE #1

| Parameter | Effect on current |
|---|---|
| Device area | Linear |
| Oxide thickness | Inverse exponential |
| Oxygen to silicon ratio (x) | Inverse power law or inverse exponential |

So, to increase the current in a highly scaled (small area) device, the oxide thickness should be decreased or the oxygen to silicon ratio (i.e., increase silicon content) should be decreased.

Example 2

Figure 8:
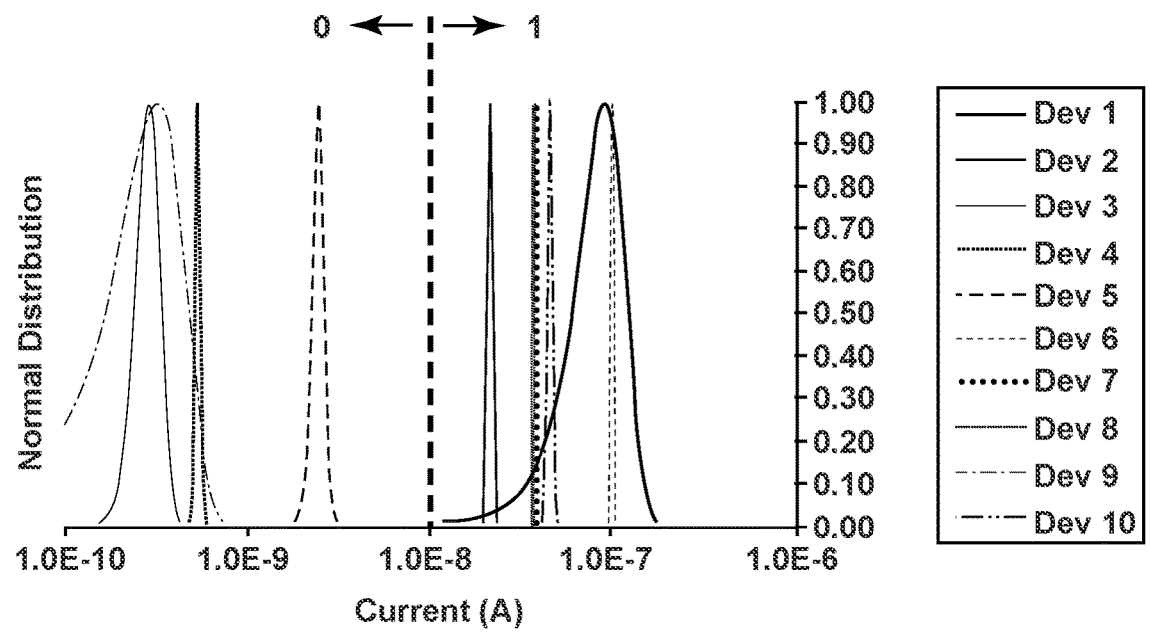
FIG. 8 is a graph of an example of normal distributions of measured currents for eight PUF devices in a crossbar array.

FIG. 8 shows the results from ten consecutive PUF devices in a 32×32 array of PUF devices comprising Ni—$SiO_x$—Ni. The $SiO_x$ material is 5 nanometers thick and deposited by plasma-enhanced chemical vapor deposition. The Ni material is 100 nanometers thick. A voltage of 0.5 volts is applied to the appropriate electrodes and the current flowing through the $SiO_x$ at the corresponding crossing point is measured. This was performed twenty times for each individual device to assess stability. The results illustrated in FIG. 8 show tight distributions for each individual device but huge differences from device-to-device. This is desirable in a PUF as the current flow in the array can be binned via a current threshold into 0s and 1s and each device can return the same number every time it is read. It is desirable to have large differences between devices so that the measurement and binning process is easy. Selecting a current threshold for this array of 1E-8A, a random number is obtained out of those ten devices. Taking the logic threshold as $10^{-8}$ A and Dev 10 being the most significant bit ("MSB") and Dev 1 being the least significant bit ("LSB"), this pattern gives the ten digit binary number 1011100011. The read operation would be temperature compensated so that the same number was obtained regardless of the operating temperature of the circuit. For example, higher temperature means more current flow through the $SiO_x$ for the same voltage and so the threshold should be higher to obtain the same device-to-device distribution of 0s and 1s or the reading voltage should be lowered, again to obtain the same distribution at higher temperature. A constant current could be applied to these devices and the voltage read across them instead (the voltage threshold would go down with increasing temperature in the compensation scheme). It is possible to have a random number that is 1,024 binary digits long if the entire array was used and much larger arrays are also possible. There is a large dynamic range in these devices (over three orders of magnitude) that several thresholds could be added to obtain higher radix numbers—not just 0 and 1 but 0, 1 and 2 by putting in two thresholds, etc.

Example 3

Figure 9:
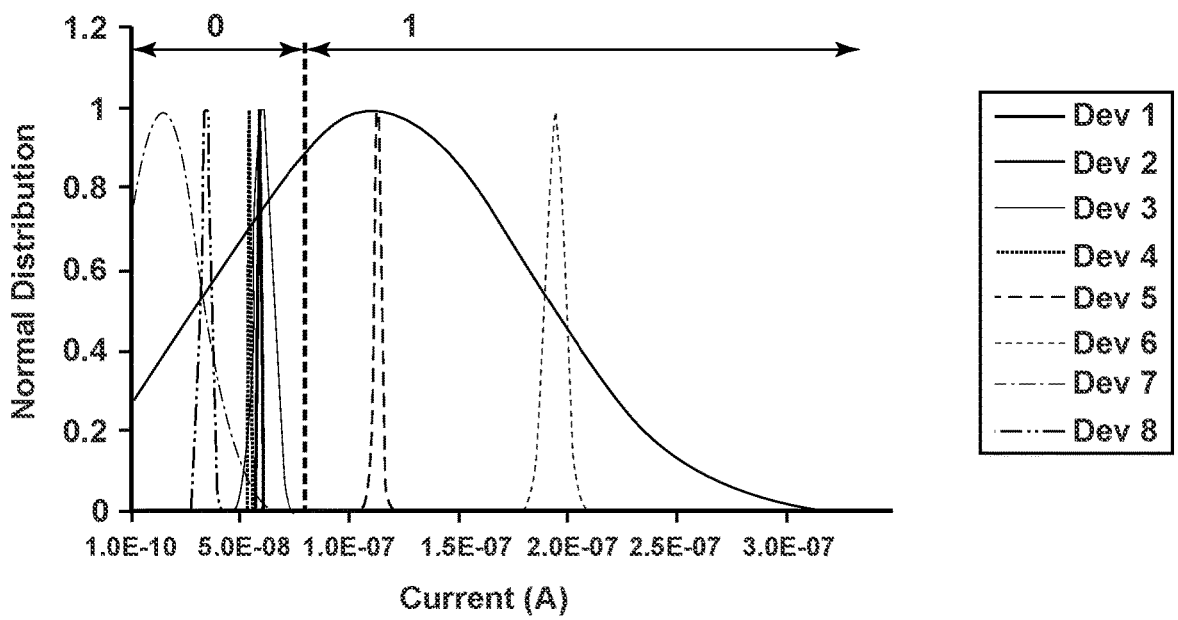
FIG. 9 is a graph of an example of normal distributions of measured currents for ten PUF devices in a crossbar array.

FIG. 9 shows the results for eight consecutive PUF devices (an 8-bit word) in the diagonal of the array, showing the distributions of 100 current measurements at 0.5 volt bias for each of the PUF devices. Table #2 (included below) also show the results. As desired, the standard deviation ("SD") of the entire set is $5.36 \times 10^{-8}$ amps, which is larger than all but one of the device SDs (device 2, SD=$6.93 \times 10^{-8}$ A), and the mean current of the set (the mean of means) is $8.01 \times 10^{-8}$ A. Taking this mean current for all devices as the delineator of logic values 0 and 1, the generated word using the individual device averages, with Device 1 as the MSB and Device 8 as the LSB, is 01001100. The large SD of Device 2 coupled with its mean current of $1.12 \times 10^{-7}$ amps being only 0.5 device SDs away from the 0/1 threshold means that this element could be misread as a 0 around 31% of the time. All the other devices are around four or more device SDs from the threshold and so the error rate is much smaller (0.01% or less).

TABLE #2

| Device # | Current (A) | Binary value | Device SD |
|---|---|---|---|
| 1 | 5.87E−08 | 0 | 6.49E−10 |
| 2 | 1.12E−07 | 1 | 6.93E−08 |
| 3 | 6.03E−08 | 0 | 4.10E−09 |
| 4 | 5.41E−08 | 0 | 4.94E−10 |
| 5 | 1.13E−07 | 1 | 2.02E−09 |
| 6 | 1.94E−07 | 1 | 4.24E−09 |
| 7 | 1.46E−08 | 0 | 1.66E−08 |
| 8 | 3.42E−08 | 0 | 2.22E−09 |
| Population mean | 8.01E−08 | | |
| Population SD | 5.36E−08 | | |

In some implementations that include more PUF devices in the array to generate a random word, PUF devices with high error rates can be ignored and replaced with more stable PUF devices in the array, for example, during a self-test start-up sequence. For example, returning to FIG. 5, the electronic controller 504 may be configured to test the plurality of PUF devices 502 to determine PUF devices 502 with low error rates, select a subset of the plurality of PUF devices 502 from the PUF devices 502 with low error rates, and determine a binary number by reading the binary values associated with the subset of the plurality of PUF devices 502.

Example 4

Figure 10:
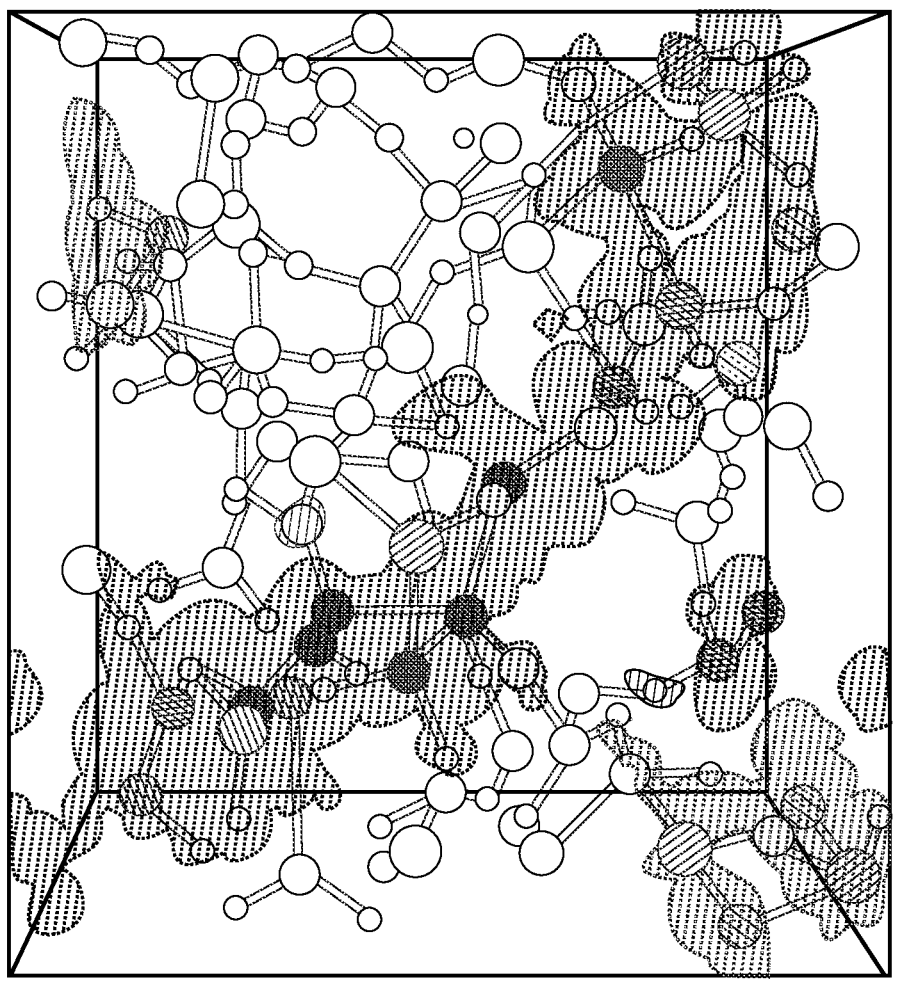
FIG. 10 is three-dimensional model of an example of an iso-surface plot for a DFT simulation of $SiO_x$ where x is 1.3.

Additional testing uncovered why silicon-rich (or oxygen deficient) materials behave the way they do, i.e., pass much more current than stoichiometric $SiO_2$ and also why there are such large differences from device-to-device. A DFT simulation of $SiO_x$ (x=1.3 to 1.7) was run along with "space projected conductivity" techniques to determine where the current paths are in the material. One example of a DFT simulation is shown in FIG. 10 (for x=1.3). The shaded areas are the high conductivity regions, and these tend to be coincident with oxygen vacancies. The results illustrated that while moving from x=1.7 to x=1.3, little "chains" of silicon atoms are seen forming, like nanoscale conducting "filaments" in the oxide. These chains are randomly oriented as they form during the deposition of the oxide from the gas phase—the entropy comes from diffusion processes (which are "naturally random"). It is expected to see large changes in how the current flows in these materials as this will depend on how the filaments line up with each other between the electrodes. The less silicon-rich the material, the less these chains form and the less the variation between PUF devices. Too much silicon is undesirable, otherwise all the conducting regions would join up and again less variation from device-to-device would be observed. Accordingly, it is desirable for x to be around 1.3 (+/−0.1 or so). Thus, in some implementations, the x value of the layer of silicon suboxide is about 1.3.

Additionally, these elements are not only useful for producing random numbers for encryption but also for providing unique IDs for chips. Right now, to give an IC its own unique registration number, an array or large "e-fuse" devices that get programmed (essentially shorted out by applying a high voltage) have to be built before the chip leaves the factory. These arrays give each chip a unique number without the need for large e-fuse devices that take up precious silicon real estate or programming operations that take up valuable testing time.

Various features and advantages of the invention are set forth in the following claims.

What is claimed is:

1. A system for physical unclonable function ("PUF") generation, the system comprising:
   a plurality of PUF devices, each of the plurality of PUF devices including:
      a first electrochemically-inactive electrode,
      a second electrochemically-inactive electrode, and
      a layer of silicon suboxide ($SiO_x$) positioned directly between the first electrochemically-inactive electrode and the second electrochemically-inactive electrode; and
   an electronic controller communicably coupled to the plurality of PUF devices and configured to read binary values associated with the plurality of PUF devices,
   wherein the x in the layer of $SiO_x$ is less than 2,
   wherein each of the plurality of PUF devices is between 2 μm and 10 μm in diameter,.
   the first electrochemically-inactive electrode comprising at least one selected from the group consisting of tungsten, nickel, platinum, titanium nitride, tantalum nitride, titanium tungsten, silicon, and polycrystalline silicon; and
   the second electrochemically-inactive electrode comprising at least one selected from the group consisting of tungsten, nickel, platinum, titanium nitride, tantalum nitride, titanium tungsten, silicon, and polycrystalline silicon.

2. The system of claim 1, wherein the electronic controller is further configured to read the binary values by applying a voltage to the plurality of PUF devices, wherein the voltage is less than or equal to 1 volt.

3. The system of claim 1, wherein the electronic controller is further configured to read the binary values by applying a current to the plurality of PUF devices, wherein the current is less than or equal to 100 nanoamps.

4. The system of claim 1, wherein a thickness of the layer of silicon suboxide is between 4 nanometers and 8 nanometers.

5. The system of claim 1, wherein an x value of the layer of silicon suboxide is between 1.2 and 1.6.

6. The system of claim 1, wherein an x value of the layer of silicon suboxide is about 1.3.

7. The system of claim 1, wherein the electronic controller is further configured to:
   test the plurality of PUF devices to determine PUF devices with low error rates,
   select a subset of the plurality of PUF devices from the PUF devices with low error rates, and
   determine a binary number by reading the binary values associated with the subset of the plurality of PUF devices.

8. The system of claim 1, wherein the plurality of PUF devices are arranged in a crossbar array.

* * * * *